United States Patent
Wolhowe

(10) Patent No.: US 10,413,851 B2
(45) Date of Patent: Sep. 17, 2019

(54) FUEL FILTER WITH WATER SEPARATOR

(71) Applicant: Donaldson Company, Inc., Minneapolis, MN (US)

(72) Inventor: Linda Wolhowe, Eden Prairie, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 185 days.

(21) Appl. No.: 15/323,629

(22) PCT Filed: Jul. 2, 2015

(86) PCT No.: PCT/US2015/039077
§ 371 (c)(1),
(2) Date: Jan. 3, 2017

(87) PCT Pub. No.: WO2016/004365
PCT Pub. Date: Jan. 7, 2016

(65) Prior Publication Data
US 2017/0144091 A1    May 25, 2017

Related U.S. Application Data

(60) Provisional application No. 62/020,887, filed on Jul. 3, 2014.

(51) Int. Cl.
*B01D 29/21* (2006.01)
*B01D 29/58* (2006.01)
(Continued)

(52) U.S. Cl.
CPC ........... *B01D 36/003* (2013.01); *B01D 29/21* (2013.01); *B01D 29/54* (2013.01); *B01D 29/58* (2013.01);
(Continued)

(58) Field of Classification Search
CPC .... B01D 29/022; B01D 27/14; B01D 27/146; B01D 46/522; B01D 46/523;
(Continued)

(56) References Cited

U.S. PATENT DOCUMENTS 3,288,299 A   11/1966   Pettet et al.
4,406,787 A    9/1983   Sueto et al.
(Continued)

FOREIGN PATENT DOCUMENTS

DE   19826032   3/1968
DE    3631846   4/1987
(Continued)

OTHER PUBLICATIONS

"International Preliminary Report on Patentability," for PCT application No. PCT/US2015/039077 dated Jan. 12, 2017 (7 pages).
(Continued)

*Primary Examiner* — Pranav N Patel
(74) *Attorney, Agent, or Firm* — Pauly, DeVries Smith & Deffner LLC

(57) ABSTRACT

A filter element for filtration of fuel is disclosed. In an embodiment the filter element comprises a first filter stage surrounding at least a majority of an open central volume; a second filter stage disposed within the first stage and surrounding at least a majority of the open central volume; and at least a one hydrophobic filter stage disposed downstream of the second stage.

20 Claims, 41 Drawing Sheets

(51) Int. Cl.
  *B01D 35/30* (2006.01)
  *B01D 36/00* (2006.01)
  *B01D 35/153* (2006.01)
  *B01D 35/16* (2006.01)
  *B01D 29/54* (2006.01)
  *F02M 37/24* (2019.01)

(52) U.S. Cl.
  CPC ........... *B01D 35/153* (2013.01); *B01D 35/16* (2013.01); *B01D 35/306* (2013.01); *B01D 2201/0415* (2013.01); *B01D 2201/12* (2013.01); *B01D 2201/291* (2013.01); *B01D 2201/301* (2013.01); *B01D 2201/304* (2013.01); *B01D 2201/342* (2013.01); *B01D 2201/347* (2013.01); *B01D 2201/4007* (2013.01); *B01D 2201/4076* (2013.01); *F02M 37/24* (2019.01)

(58) Field of Classification Search
  CPC ...... B01D 63/067; B01D 63/14; B01D 63/06; B01D 63/062; B01D 2201/12; B01D 2201/122; B01D 2201/125; B01D 2201/127; B01D 2201/162; B01D 2201/188; B01D 2201/291; B01D 2201/295; B01D 2201/298; B01D 2201/301; B01D 2201/302; B01D 2201/304; B01D 2201/305; B01D 2201/316; B01D 2201/34; B01D 35/005; B01D 69/04; B01D 69/046
  See application file for complete search history.

(56) References Cited

U.S. PATENT DOCUMENTS

| | | |
|---|---|---|
| 5,089,129 A | 2/1992 | Brigman |
| 5,548,893 A | 8/1996 | Koelfgen et al. |
| 5,906,737 A | 5/1999 | Hoeppner |
| 6,248,236 B1 | 6/2001 | Hodgkins et al. |
| 6,409,804 B1 | 6/2002 | Cook et al. |
| 6,526,741 B2 | 3/2003 | Whitehead et al. |
| 6,620,316 B1 | 9/2003 | Sakraschinsky et al. |
| 6,716,349 B2 | 4/2004 | Baracchi et al. |
| 6,936,169 B2 | 8/2005 | Baumann et al. |
| 7,156,890 B1 | 1/2007 | Thompson et al. |
| 7,314,497 B2 | 1/2008 | Kahlbaugh et al. |
| 7,326,342 B2 | 2/2008 | Richmond et al. |
| 7,531,018 B2 | 5/2009 | Becker et al. |
| 7,588,615 B2 | 9/2009 | Gillenberg et al. |
| 7,824,550 B2 | 11/2010 | Abreu et al. |
| 7,887,701 B2 | 2/2011 | Schmid et al. |
| 7,938,963 B2 | 5/2011 | Klein et al. |
| 8,017,011 B2 | 9/2011 | Ellis et al. |
| 8,021,457 B2 | 9/2011 | Dema et al. |
| 8,114,291 B2 | 2/2012 | Ellis et al. |
| 8,236,176 B2 | 8/2012 | Fall et al. |
| 8,388,834 B2 | 3/2013 | Rösgen et al. |
| 8,544,657 B2 | 10/2013 | Chen et al. |
| 8,590,712 B2 | 11/2013 | Wieczorek et al. |
| 8,673,138 B2 | 3/2014 | Braunheim et al. |
| 8,833,567 B2 | 9/2014 | Stanfeld et al. |
| 8,978,899 B2 | 3/2015 | Ferrer |
| 9,027,765 B2 | 5/2015 | Battenfeld et al. |
| 9,056,268 B2 | 6/2015 | Jones et al. |
| 9,108,125 B2 | 8/2015 | Braunheim |
| 9,333,448 B2 | 5/2016 | Braunheim et al. |
| 9,388,384 B2 | 7/2016 | Kim et al. |
| 2002/0157999 A1 | 10/2002 | Baracchi et al. |
| 2005/0023209 A1 | 2/2005 | Clausen et al. |
| 2005/0161386 A1 | 7/2005 | Gustafson et al. |
| 2006/0006109 A1 | 1/2006 | Klein et al. |
| 2006/0053756 A1 | 3/2006 | Hawkins et al. |
| 2006/0054547 A1 | 3/2006 | Richmond et al. |
| 2006/0186031 A1 | 8/2006 | Fick et al. |
| 2006/0277877 A1 | 12/2006 | Shields et al. |
| 2006/0278575 A1 | 12/2006 | Jokschas et al. |
| 2007/0084776 A1 | 4/2007 | Sasur |
| 2007/0240390 A1 | 10/2007 | Becker et al. |
| 2008/0060985 A1 | 3/2008 | Carew et al. |
| 2008/0135469 A1 | 6/2008 | Fremont et al. |
| 2008/0210618 A1 | 9/2008 | Kiedaisch et al. |
| 2009/0008321 A1 | 1/2009 | Tanner et al. |
| 2009/0114589 A1 | 5/2009 | Reiland et al. |
| 2009/0200221 A1 | 8/2009 | Hacker et al. |
| 2010/0025317 A1 | 2/2010 | Fall et al. |
| 2010/0044295 A1 | 2/2010 | Honermann et al. |
| 2010/0096304 A1 | 4/2010 | Gänswein et al. |
| 2011/0132816 A1 | 6/2011 | Vasilescu |
| 2011/0198280 A1 | 8/2011 | Jones et al. |
| 2011/0203982 A1 | 8/2011 | Braunheim et al. |
| 2011/0259796 A1 | 10/2011 | Chen et al. |
| 2012/0031824 A1 | 2/2012 | Braunheim et al. |
| 2012/0234743 A1 | 9/2012 | Braunheim et al. |
| 2012/0234748 A1 | 9/2012 | Little et al. |
| 2012/0248034 A1 | 10/2012 | Segit et al. |
| 2013/0062270 A1 | 3/2013 | Braunheim et al. |
| 2013/0092639 A1 | 4/2013 | Harp et al. |
| 2013/0146524 A1 | 6/2013 | Veit et al. |
| 2013/0248436 A1 | 9/2013 | Hacker et al. |
| 2013/0264275 A1 | 10/2013 | John |
| 2013/0327699 A1 | 12/2013 | Gaenswein et al. |
| 2014/0034580 A1 | 2/2014 | Chen et al. |
| 2014/0109885 A1 | 4/2014 | Kalayci et al. |
| 2014/0284264 A1* | 9/2014 | Klein .................. F02M 37/221 210/437 |
| 2014/0311963 A1 | 10/2014 | Bortnik et al. |
| 2014/0331626 A1 | 11/2014 | Nagy et al. |
| 2015/0027942 A1 | 1/2015 | Chen et al. |
| 2015/0290561 A1 | 10/2015 | Barsness et al. |
| 2016/0038865 A1 | 2/2016 | Jones et al. |
| 2018/0185777 A1 | 7/2018 | Rahmathullah et al. |

FOREIGN PATENT DOCUMENTS

| | | |
|---|---|---|
| DE | 3921369 | 1/1990 |
| DE | 4409570 | 5/1995 |
| DE | 4417298 | 11/1995 |
| DE | 19716085 A1 | 10/1998 |
| DE | 19850379 | 4/2000 |
| DE | 19951085 | 4/2001 |
| DE | 102004025274 | 12/2004 |
| DE | 102005015194 | 10/2006 |
| DE | 19716085 | 2/2007 |
| DE | 202006001793 | 3/2007 |
| DE | 202006006084 | 9/2007 |
| DE | 102006060128 | 6/2008 |
| DE | 202006019301 | 6/2008 |
| DE | 102007009352 | 8/2008 |
| DE | 102012109761 | 5/2013 |
| EP | 260069 | 3/1988 |
| EP | 1233173 | 8/2002 |
| EP | 1256707 | 11/2002 |
| EP | 0754483 | 2/2004 |
| EP | 1695753 | 8/2006 |
| EP | 1932574 | 6/2008 |
| EP | 1974786 | 10/2008 |
| EP | 2535550 | 6/2014 |
| FR | 2601600 | 1/1988 |
| FR | 2864452 | 7/2005 |
| FR | 2879944 | 7/2007 |
| GB | 1088029 | 10/1967 |
| GB | 2241443 | 9/1991 |
| JP | 2001038129 | 2/2001 |
| JP | 2013521428 | 6/2013 |
| WO | 9919043 | 4/1999 |
| WO | 02053258 | 7/2002 |
| WO | 2004082804 | 9/2004 |
| WO | 2005021131 | 3/2005 |
| WO | 2007006370 | 1/2007 |
| WO | 2007010037 | 1/2007 |
| WO | 2008023029 | 2/2008 |
| WO | 2010012617 | 2/2010 |

(56) References Cited

FOREIGN PATENT DOCUMENTS

| WO | 2010020489 | | 2/2010 |
|---|---|---|---|
| WO | 2010020514 | | 2/2010 |
| WO | 2011052818 | | 5/2011 |
| WO | 2011113723 | | 9/2011 |
| WO | 2011127479 | | 10/2011 |
| WO | 2011146474 | | 11/2011 |
| WO | 2012059389 | | 5/2012 |
| WO | 2012076692 | | 6/2012 |
| WO | 2013000807 | | 1/2013 |
| WO | WO2013083365 | * | 6/2013 |
| WO | 2016004365 | | 1/2016 |
| WO | 2016210153 | | 12/2016 |

OTHER PUBLICATIONS

"International Search Report & Written Opinion," for PCT/US2015/039077 dated Oct. 12, 2015 (9 pages).
Response to Communication Pursuant to Rules 161(1) and 162 EPC for European Patent Application No. 16815319.5 filed with the EPO Aug. 15, 2018 (7 pages).
Response to Final Office Action, dated Feb. 7, 2018, for U.S. Appl. No. 13/639,955, submitted via EFS-Web on Jul. 7, 2018, 12 pages.
Final Office Action for U.S. Appl. No. 13/639,955 dated Apr. 24, 2015 (11 pages).
Final Office Action for U.S. Appl. No. 13/639,955 dated Feb. 7, 2018 (11 pages).
Final Office Action for U.S. Appl. No. 13/639,955 dated Nov. 18, 2016 (14 pages).
International Preliminary Report on Patentability for PCT Application No. PCT/US2016/039049 dated Jan. 4, 2018 (6 pages).
International Search Report & Written Opinion for PCT/US2016/039049 dated Sep. 19, 2016 (8 pages).
Non Final Office Action for U.S. Appl. No. 13/639,955 dated Feb. 25, 2016 (10 pages).
Non-Final Final Office Action for U.S. Appl. No. 13/639,955 dated Jun. 23, 2017 (14 pages).
Non-Final Office Action for U.S. Appl. No. 13/639,955 dated Sep. 11, 2014 (11 pages).
PCT International Preliminary Report on Patentability from International Application No. PCT/US2011/031983, dated Oct. 18, 2012, 9 pages.
PCT International Search Report and Written Opinion from International Application No. PCT/US2011/031983, corresponding to U.S. Appl. No. 61/322,673, dated Jun. 20, 2011, 12 pages.
Response to Final Office Action, dated Apr. 24, 2015 corresponding to U.S. Appl. No. 13/639,955, submitted on Oct. 26, 2015, 9 pages.
Response to Non-Final Office Action dated Jun. 23, 2017, for U.S. Appl. No. 13/639,955, submitted via EFS-Web on Oct. 23, 2017, 11 pages.
Non Final Office Action for U.S. Appl. No. 13/639,955 dated Sep. 6, 2018 (23 pages).

\* cited by examiner

FUEL FILTER WITH WATER SEPARATOR

This application is being filed as a PCT International Patent Application on Jul. 2, 2015, in the name of DONALDSON COMPANY, INC., a U.S. national corporation, applicant for the designation of all countries, and Linda Wolhowe, a U.S. Citizen, inventor for the designation of all countries, and claims priority to U.S. Provisional Patent Application No. 62/020,887, filed on Jul. 3, 2014, the content of which is herein incorporated by reference in its entirety.

FIELD OF THE INVENTION

The present invention is directed to fuel filters. More specifically, the present invention is directed to fuel filters constructed to remove particulates from fuel while also separating water from the fuel.

BACKGROUND

Filtration of liquid fuels for use in internal combustion engines is often essential to proper engine performance. For example, various diesel engines currently use fuel filters to remove hard particles and water that can be found in the diesel fuel. Hard particle and water removal is necessary to provide proper engine performance as well as to protect the engine components from damage. Although various filter constructions have been used for removing hard particles and water from the fuel, a need remains for improved fuel filtration systems and methods.

SUMMARY OF THE INVENTION

The present application is directed to fuel filters, in particular fuel filters configured to remove particulate contamination while also separating water from the fuel. Certain embodiments are directed to a filter element for filtration of fuel, the filter element comprising a first filter stage surrounding at least a majority of an open central volume; and at least one hydrophobic filter stage disposed downstream of the first stage. Other embodiments are directed to a filter element for filtration of fuel, the filter element comprising a first filter stage surrounding at least a majority of an open central volume; a second filter stage disposed within the first stage and surrounding at least a portion of the open central volume; and at least one hydrophobic filter stage disposed downstream of the second stage.

In some implementations the first filter stage comprises pleated filtration media. Optionally the first filter stage comprises a first media portion of radially pleated media, and a second media portion comprising non-pleated media. The first filter stage can include, for example, a multi-layer filter media. The multi-layer media can include, but is not limited to, layers directed to loading contaminants, coalescing water, supporting other layers, and growth of water droplets.

The second filter stage can include coalescing filter media configured to coalesce water from a fuel stream passing through the filter. The coalescing filter media comprises, for example, a coalescing non-woven, hydrophilic fibrous material. In certain embodiments the second filter stage surrounds a majority of the open central volume of the filter element.

The second filter stage can include a flow director in fluid communication with the third filter stage. The flow director can be configured to direct fluid flow toward the perimeter of the filter element after it has passed through the second filter stage. In some embodiments the flow director is positioned substantially outside a radius formed by the second filter stage, but inside a radius formed by the first filter stage.

In an embodiment the flow director is configured to direct fluid from the second filter stage to the third filter stage. The third filter stage can include a hydrophobic filter stage configured to separate fuel from coalesced water. In some implementations the hydrophobic filter stage comprises a hydrophobic material formed with one or more layers of hydrophobic water repelling barrier material that can be woven, molded and/or wet laid (for example). The third filter stage can be located partially or entirely within the flow director in some embodiments.

The hydrophobic filter stage can include a hydrophobic mesh material. The hydrophobic filter stage may be constructed and arranged such that fluid flow at the hydrophobic mesh is substantially tangential to the mesh surface. In some configurations the hydrophobic filter stage comprises hydrophobic media oriented substantially along a plane parallel to the central axis of the filter element. The hydrophobic filter stage may include hydrophobic media oriented along an arc along a portion of the central volume.

The hydrophobic filter stage extends, in various implementations, over a range of less than 5 to no more than 180 degrees of an arc around the central volume. In certain embodiments the hydrophobic filter stage is disposed entirely on one side of a plane containing a longitudinal axis of the filter element. In some embodiments a second hydrophobic filter stage is disposed on an opposite side of the plane containing a longitudinal axis of the filter element from the first hydrophobic filter stage. Additional hydrophobic filter stages can also be located within the filter element.

In some constructions at least one hydrophobic filter stage extends in an axial direction along a path adjacent to the second filter stage for at least a portion of the axial length of the second stage. A hydrophobic filter stage extends along less than the full axial length of the second stage in some embodiments, and extends along the full axial length of the second stage in other embodiments. In some implementations the hydrophobic filter stage ends below the end of the second stage.

In various constructions the hydrophobic filter stage includes a fluid flow surface extending in a radial direction. The hydrophobic filter stages can in addition, or alternatively, include a fluid flow surface extending in a circumferential direction. In some embodiments the hydrophobic filter stage extends over a range of less than 5 to 180 degrees of an arc around the central volume. The hydrophobic filter stage can be disposed between an outer diameter and an inner diameter of the first stage.

The filter element can include a core manifold configured to fit over a standpipe in a housing. The core manifold is typically positioned upstream and directs the flow toward the hydrophobic filter. After the fuel passes through the hydrophobic stage the fuel will pass through the opening in the core manifold downstream of the hydrophobic stage. The core manifold can include an opening that receives fluid that has passed through the hydrophobic filter stage. Thus, the filter element may be configured such that fuel to be filtered passes through the first stage to remove hard particulate contaminants, on to the second stage to coalesce water, followed by interaction with the hydrophobic filter stage to separate water while allowing passage of fuel, and concluding with water flowing through the opening in the core manifold (and subsequently out of the filter element).

In some implementations the filter element further comprises a rotational alignment element configured to engage a stand pipe assembly to which the filter element is secured. This rotational alignment element can include one or more seal members configured to create a seal over a drain in the standpipe assembly. In certain embodiments the rotational alignment element includes a projection extending from a baseplate. The rotational alignment projection can include a seal member. In alternative embodiments the rotational alignment element includes a seal that fits over a drain in the standpipe assembly without containing a projection. In some implementations the seal is an extension of the grommet.

This summary of the present invention is not intended to describe each discussed embodiment of the present invention. This is the purpose of the figures and the detailed description that follows.

FIGURES

The invention may be more completely understood in connection with the following drawings, in which.

Figure 9A:
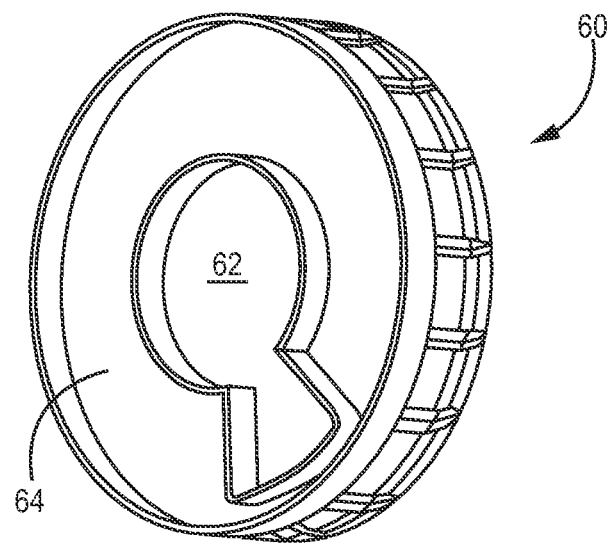
FIG. 9A is a top perspective view of a bottom end cap from a filter element constructed and arranged in accordance with an implementation of the invention.
Figure 9B:
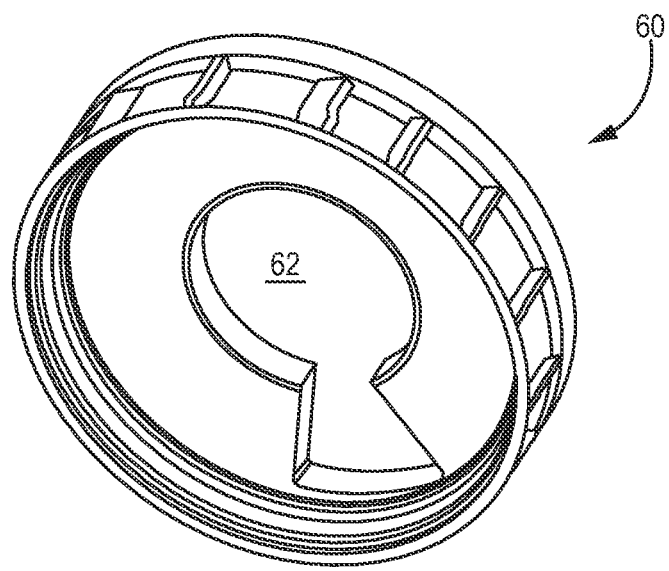

FIG. 9B bottom perspective view of a bottom end cap from a filter element constructed and arranged in accordance with an implementation of the invention.

Figure 9C:
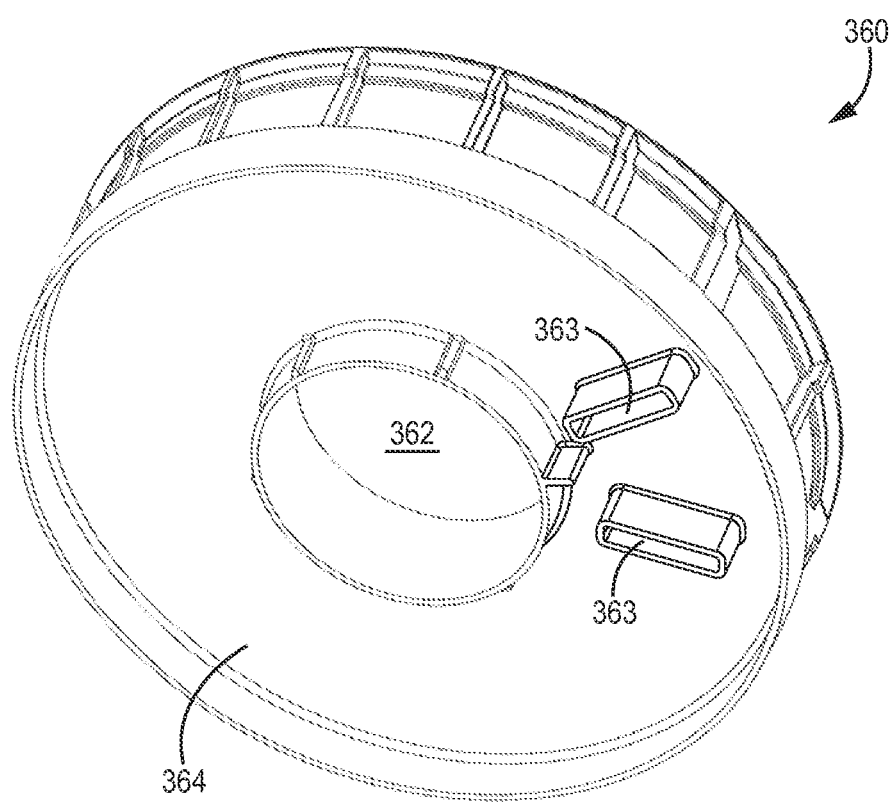

FIG. 9C is a top perspective view of a bottom end cap from a filter element constructed and arranged in accordance with an implementation of the invention.

Figure 9D:
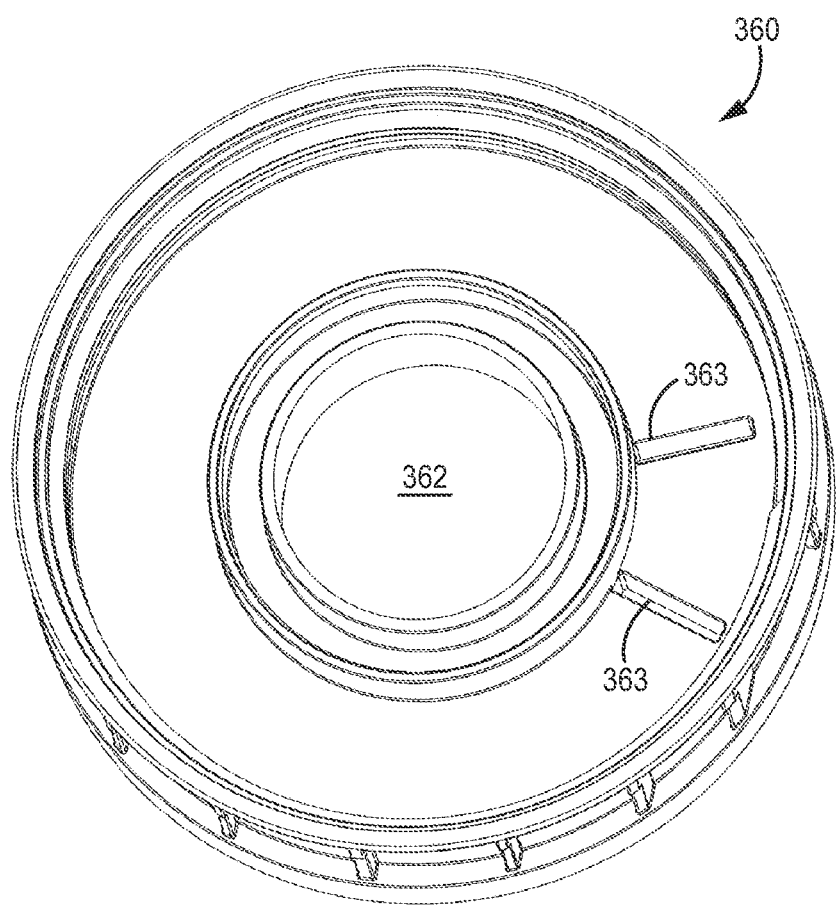

FIG. 9D bottom perspective view of a bottom end cap from a filter element constructed and arranged in accordance with an implementation of the invention.

Figure 9E:
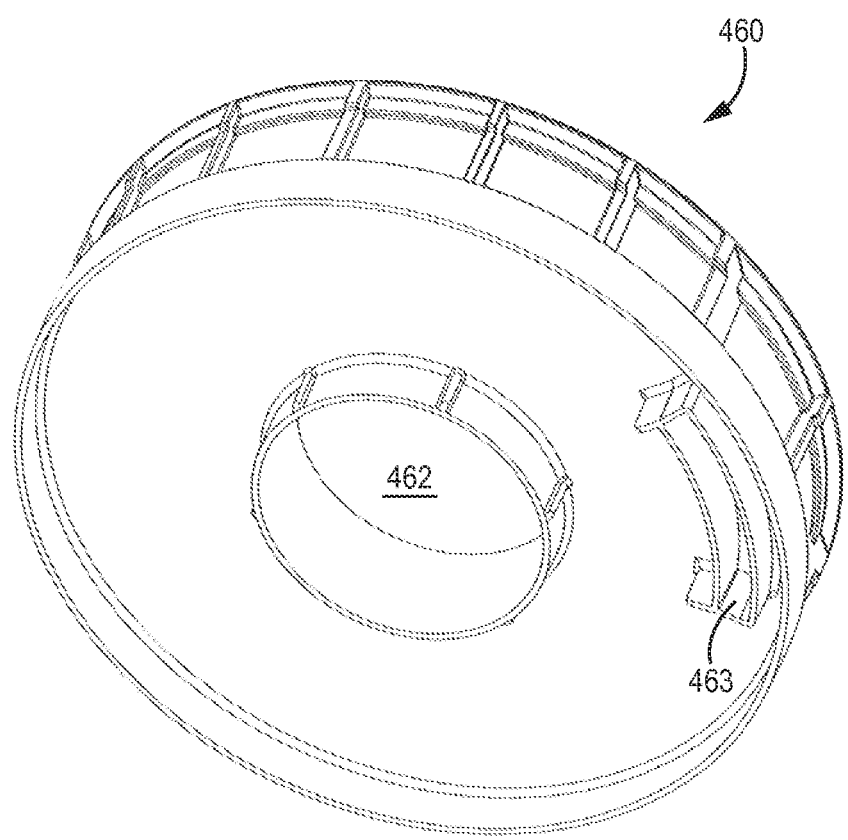

FIG. 9E is a top perspective view of a bottom end cap from a filter element constructed and arranged in accordance with an implementation of the invention.

Figure 9F:
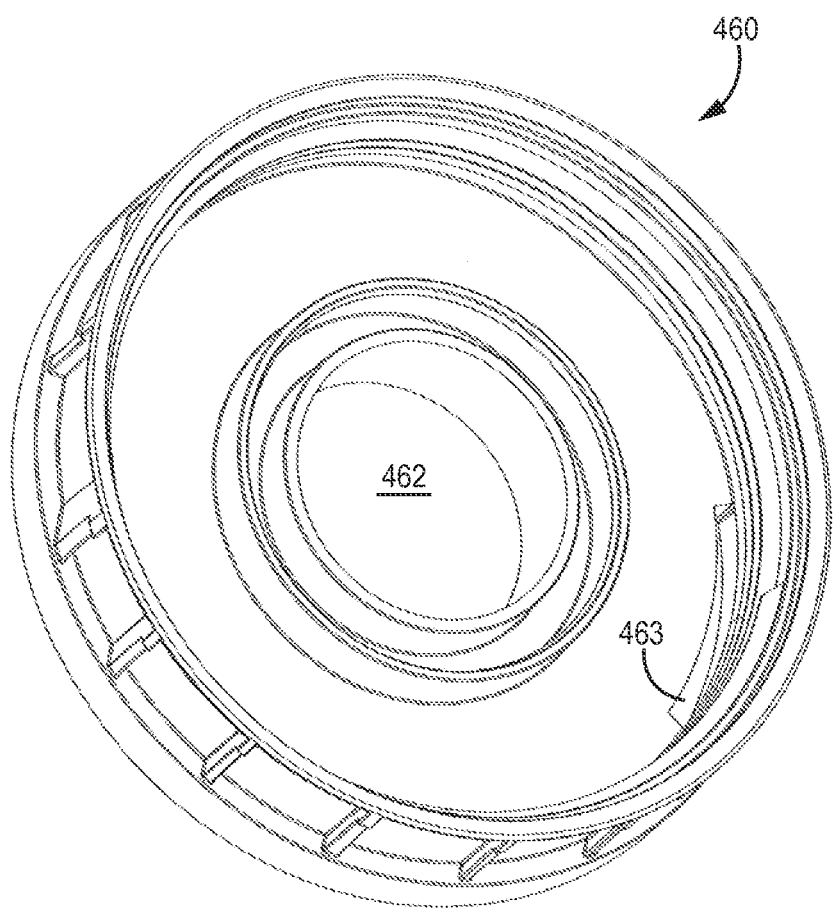

FIG. 9F bottom perspective view of a bottom end cap from a filter element constructed and arranged in accordance with an implementation of the invention.

Figure 10A:
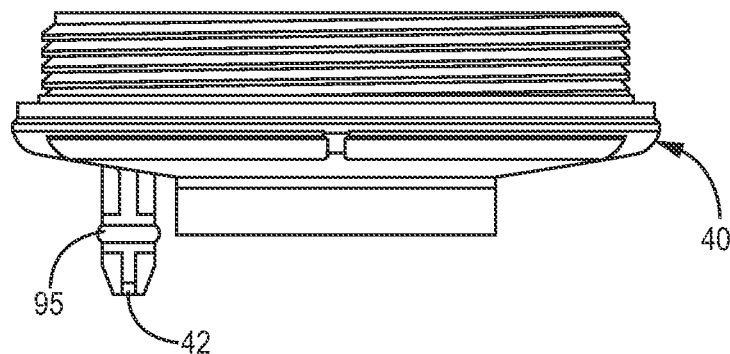

FIG. 10A is a side view of bottom cover from a filter element constructed and arranged in accordance with an implementation of the invention.

Figure 10B:
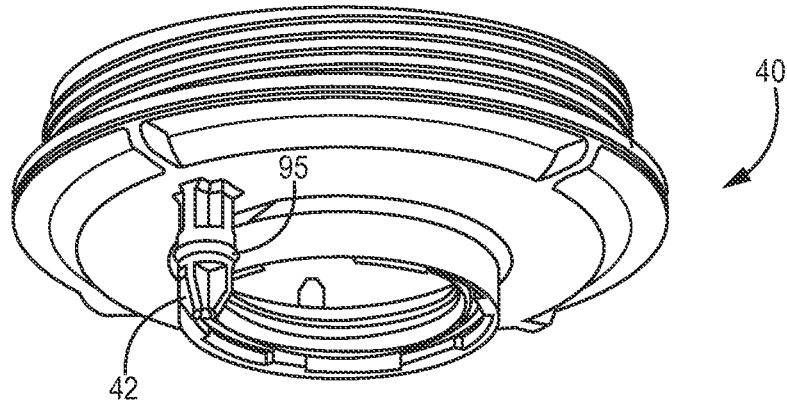

FIG. 10B bottom perspective view of a bottom cover from a filter element constructed and arranged in accordance with an implementation of the invention.

Figure 11A:
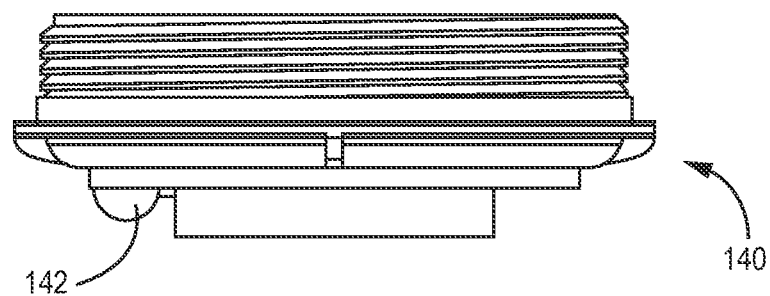

FIG. 11A is a side view of bottom cover from a filter element constructed and arranged in accordance with an implementation of the invention.

Figure 11B:
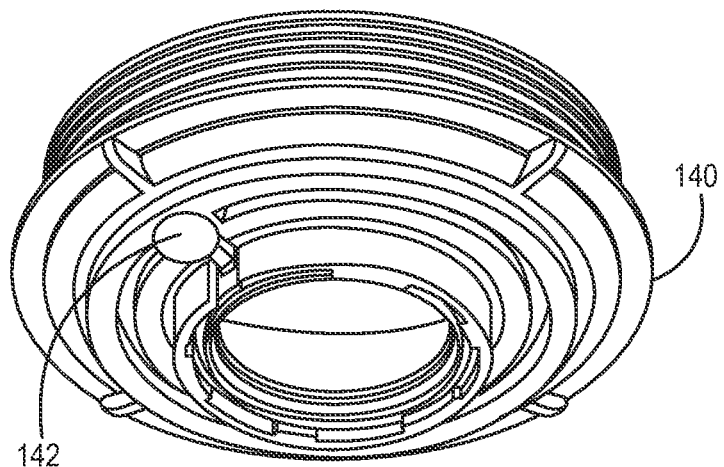

FIG. 11B bottom perspective view of a bottom cover from a filter element constructed and arranged in accordance with an implementation of the invention.

Figure 12:
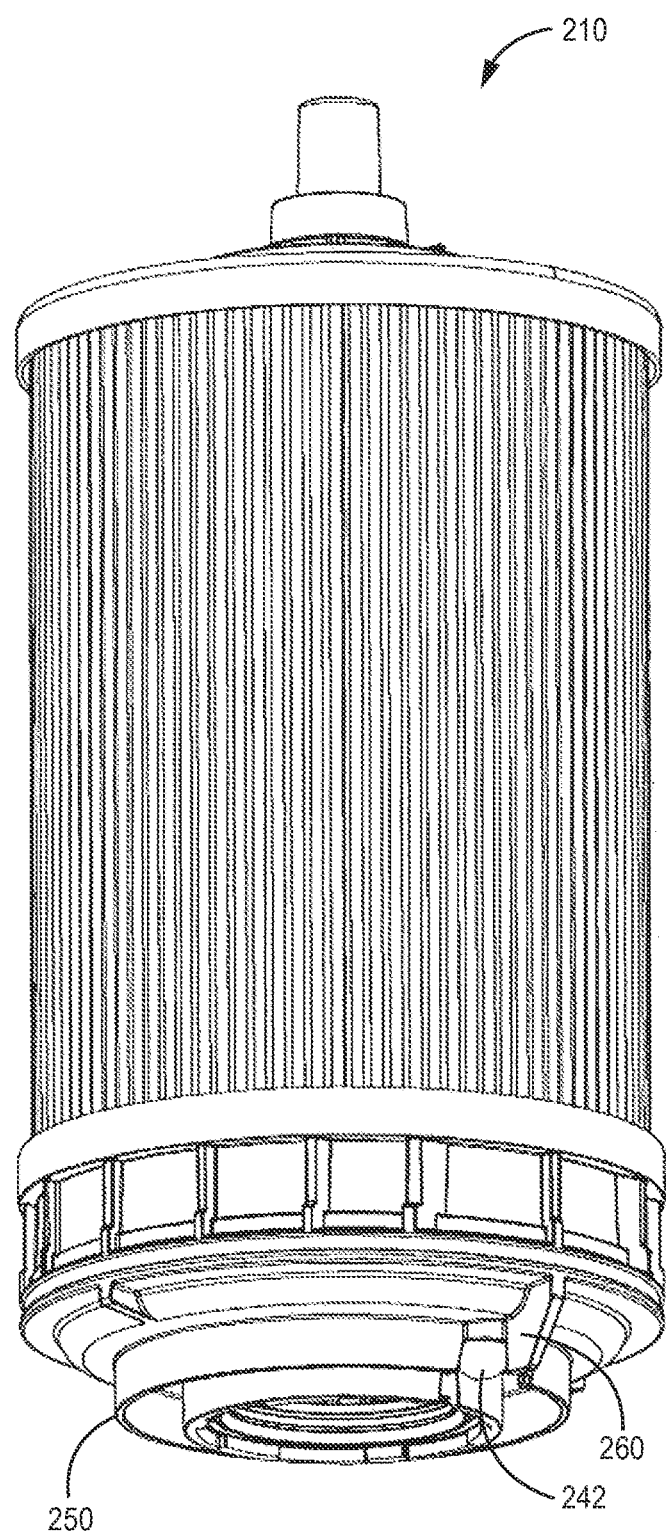

FIG. 12 is a perspective view of a filter element constructed and arranged in accordance with an implementation of the invention.

Figure 13:
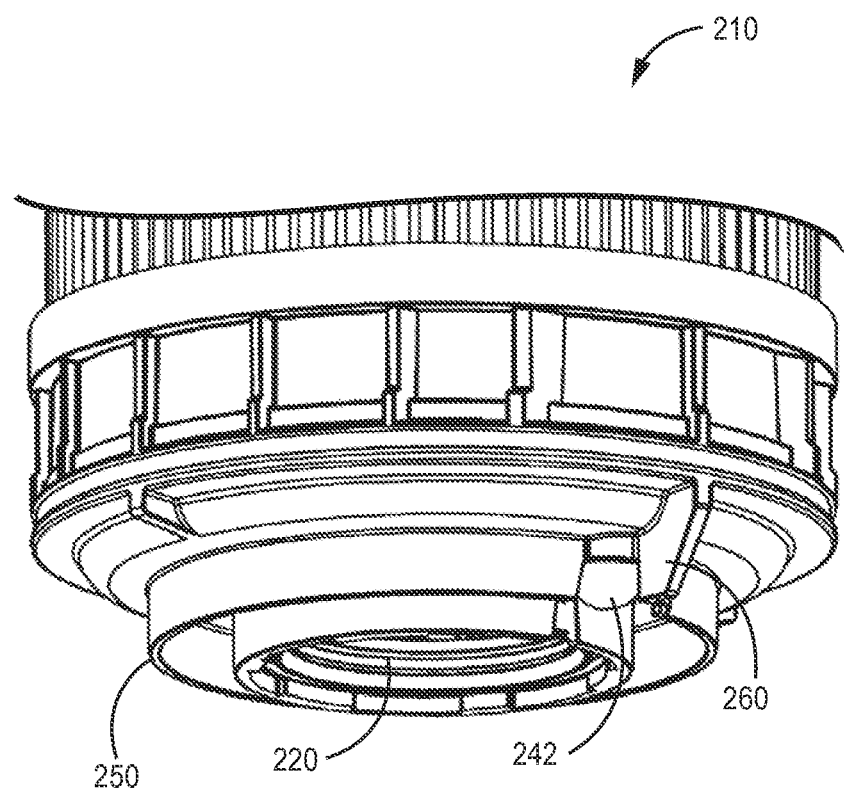

FIG. 13 is a partial perspective view of the filter element of FIG. 12, showing the bottom of the filter element.

Figure 14:
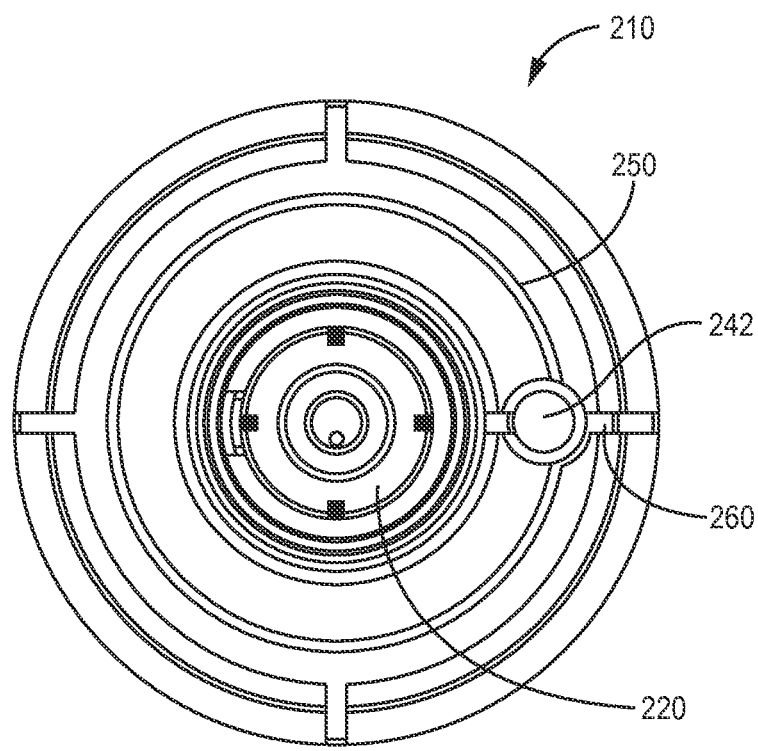

FIG. 14 is a bottom view of the filter element of FIG. 12.

Figure 15:
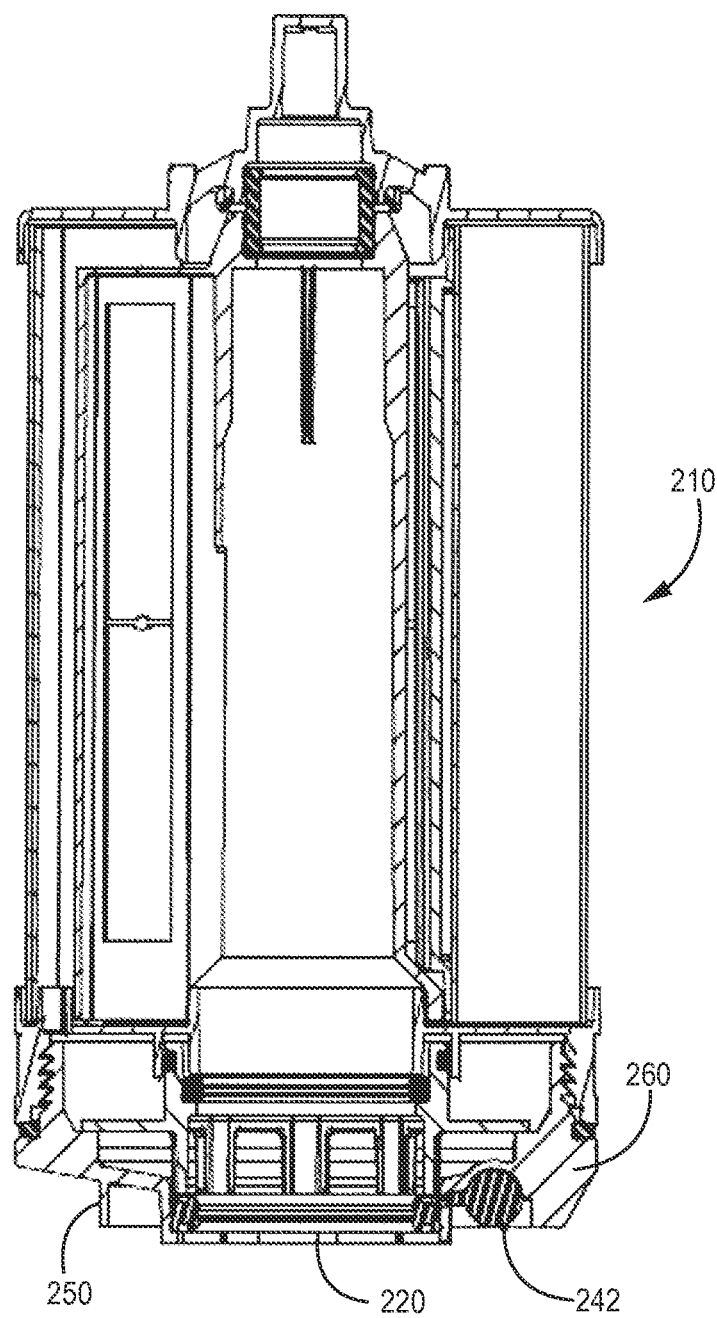

FIG. 15 is a side cross sectional view of the filter element of FIG. 12.

Figure 16:
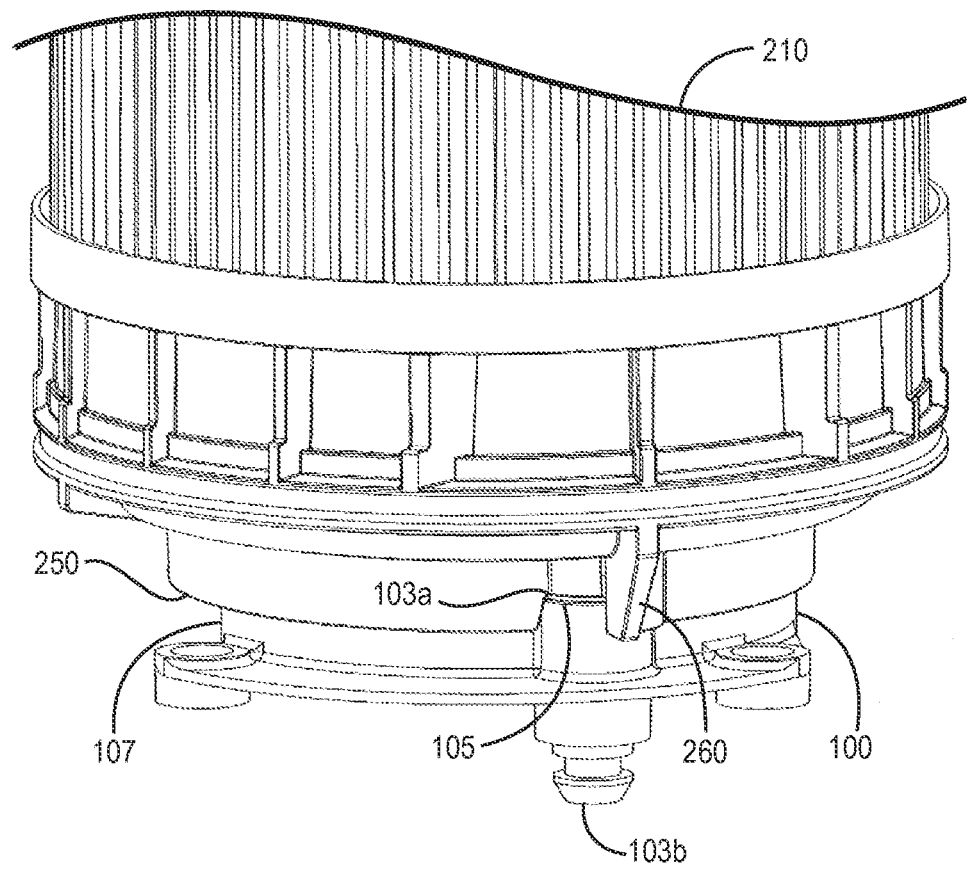

FIG. 16 is a partial perspective view of the filter element of FIG. 12, showing the bottom of the filter element mounted on a standpipe assembly.

Figure 17:
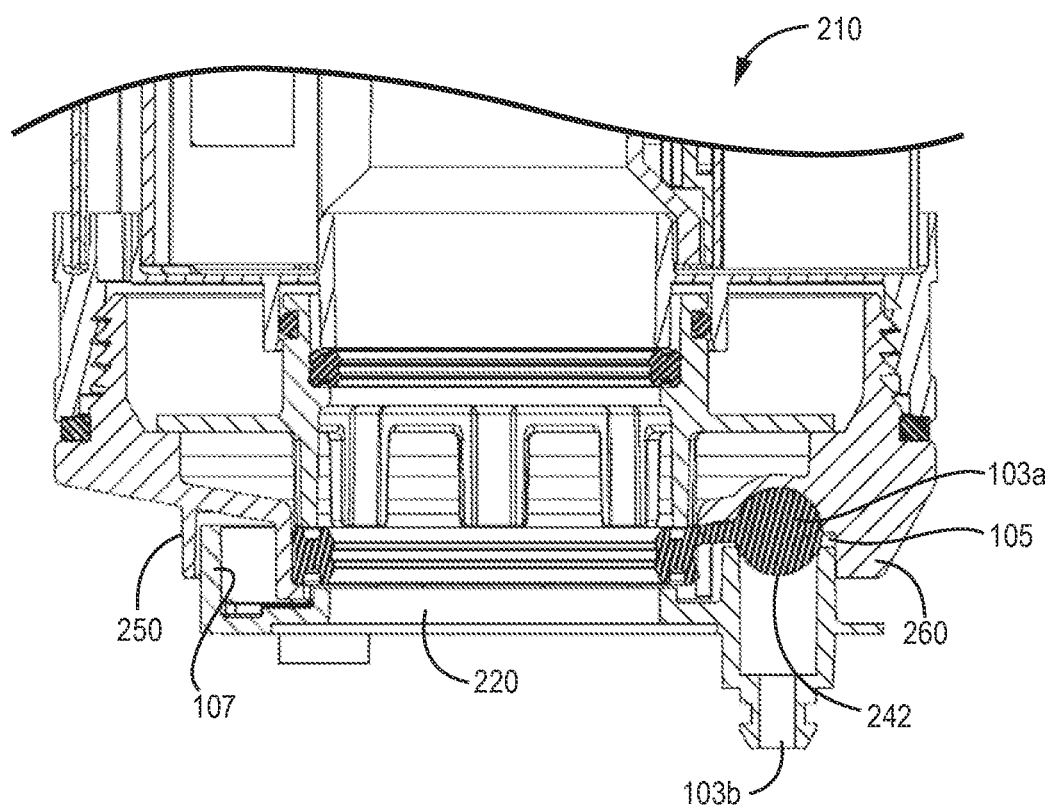

FIG. 17 is a partial side cross sectional view of the filter element of FIG. 15, showing the bottom of the filter element mounted on a standpipe assembly.

Figure 18:
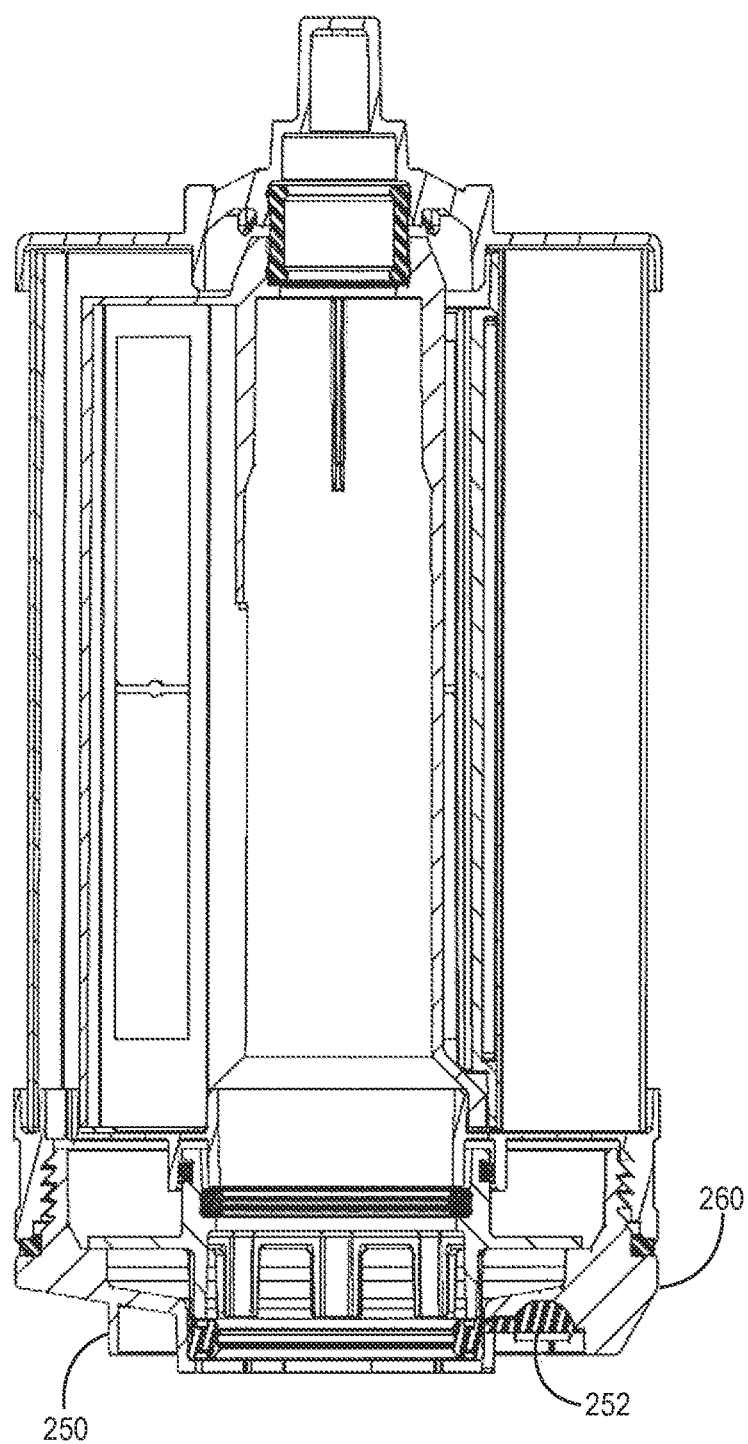

FIG. 18 is a side cross sectional view of the filter element of FIG. 17.

Figure 19:
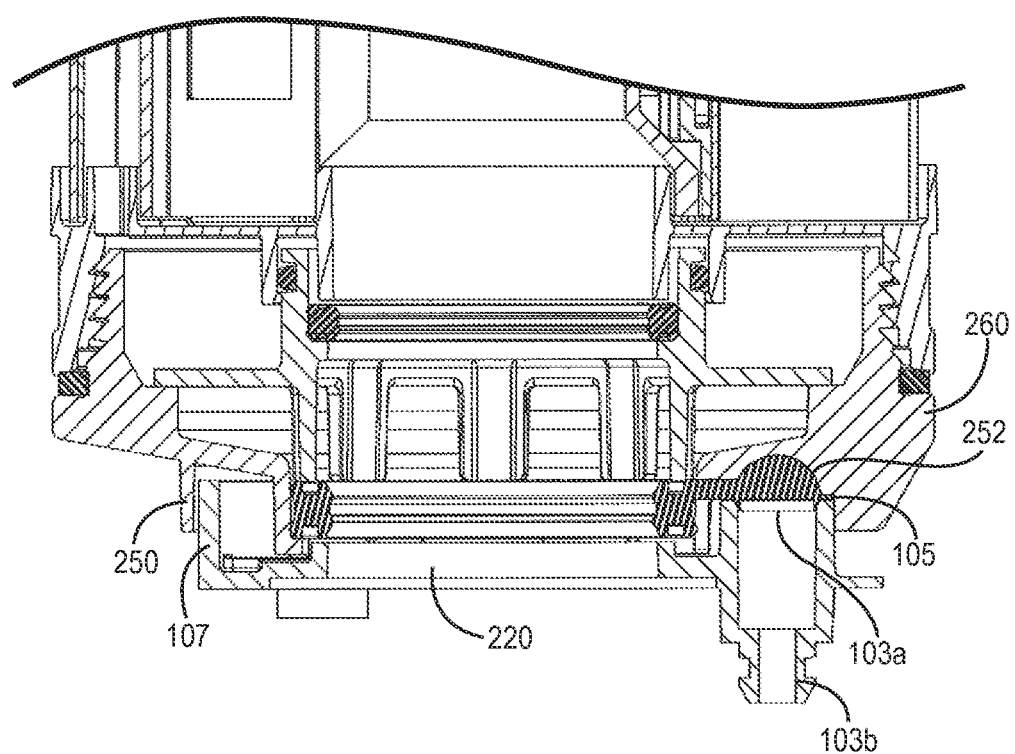

FIG. 19 is a partial side cross sectional view of the filter element, showing the bottom of the filter element mounted on a standpipe.

Figure 20A:
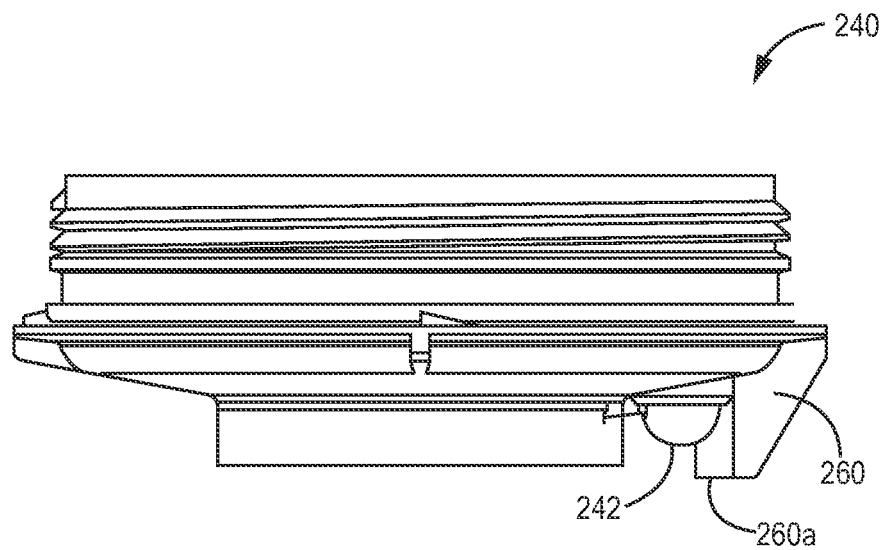

FIG. 20A is a side view of bottom cover from a filter element constructed and arranged in accordance with an implementation of the invention.

Figure 20B:
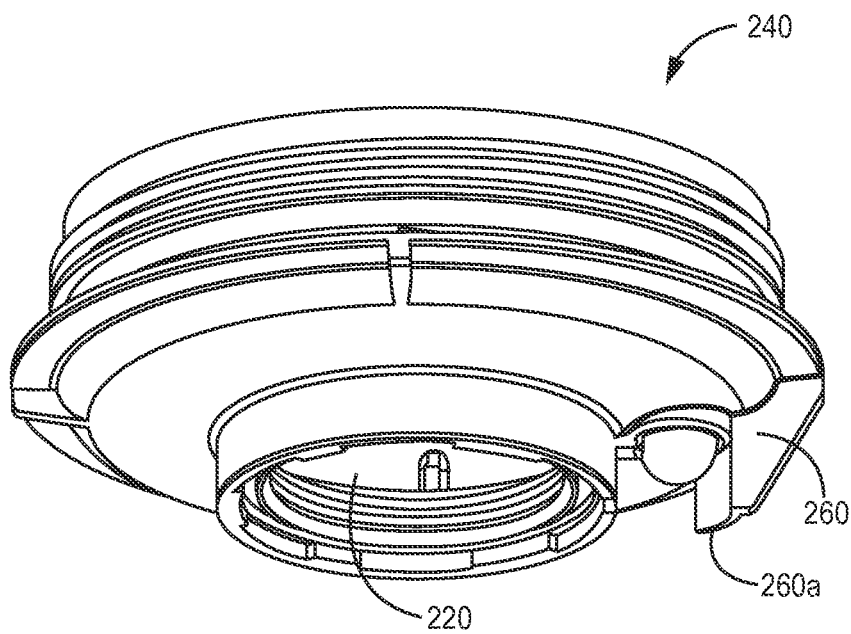

FIG. 20B bottom perspective view of a bottom cover from a filter element constructed and arranged in accordance with an implementation of the invention.

Figure 21:
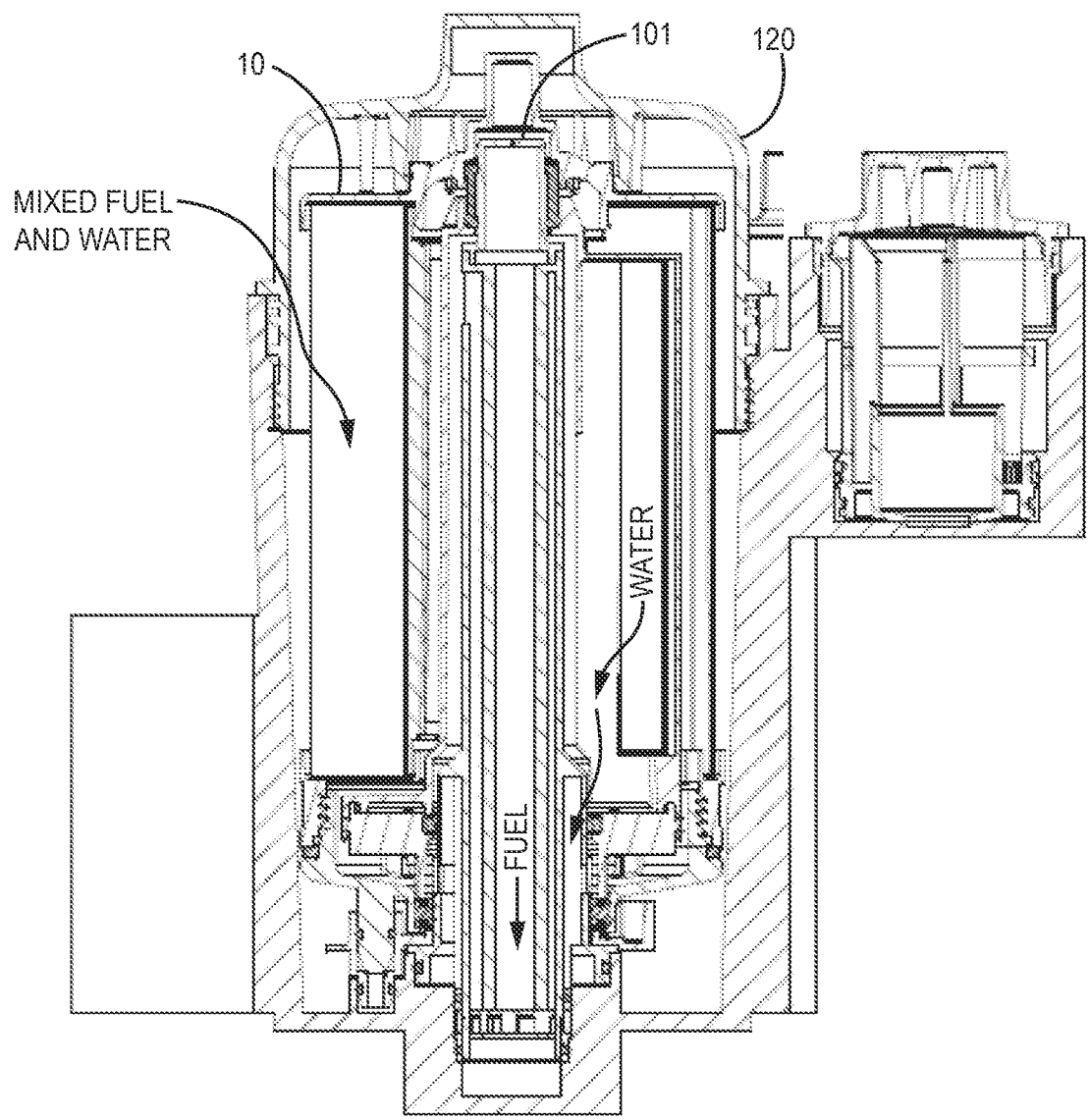

FIG. 21 is a side cross sectional view of a filter element constructed in accordance with an implementation of the invention and positioned within a housing, showing fluid flows through the filter element.

Figure 22A:
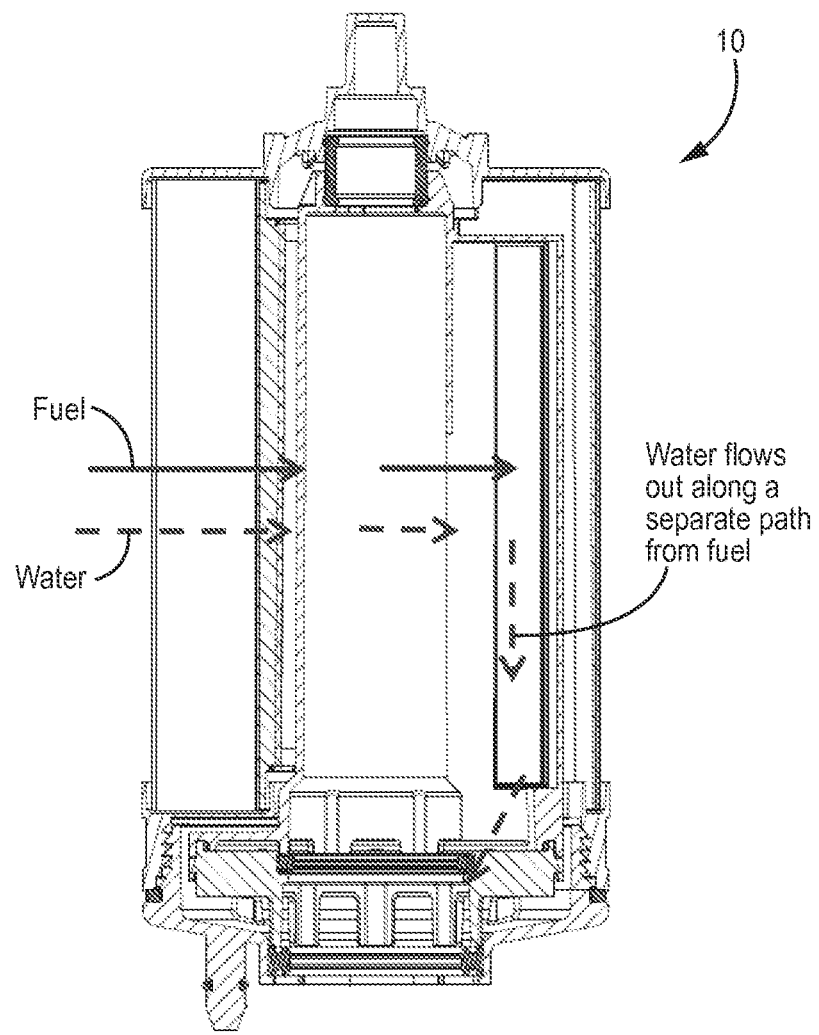

FIG. 22A is a side cross sectional view of a filter element constructed in accordance with an implementation of the invention, showing fluid flows through the filter element.

Figure 22B:
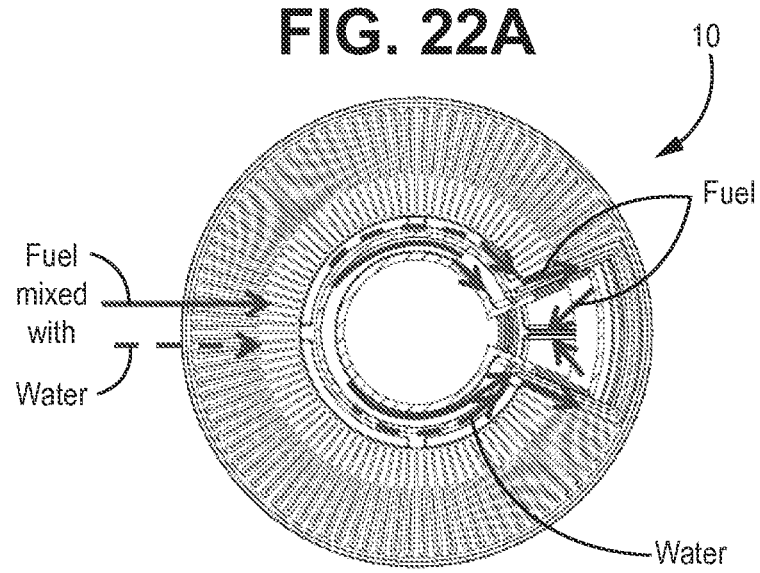

FIG. 22B is a side cross sectional view of a filter element constructed in accordance with an implementation of the invention, showing fluid flows through the filter element.

Figure 23:
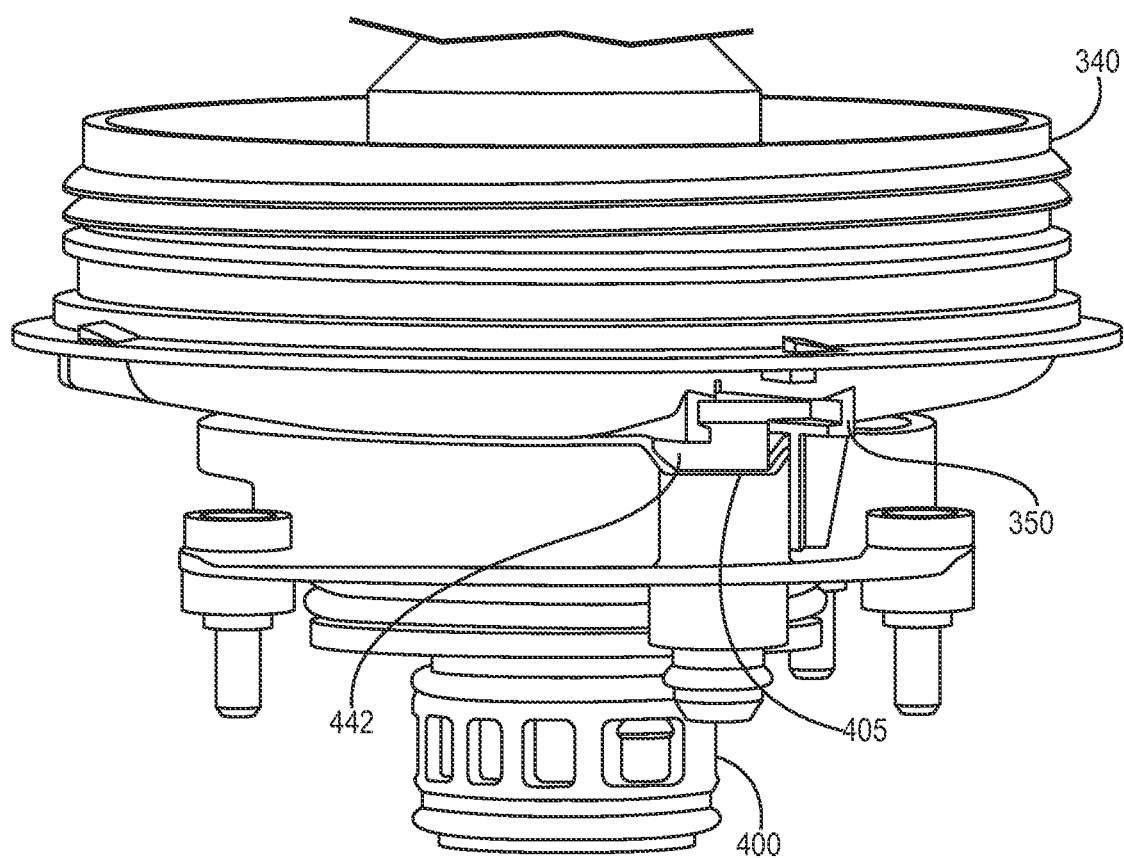

FIG. 23 is a partial side view of portions of a sealing filter and arranged in accordance with an implementation of the invention, showing the bottom plate and standpipe on which it is installed.

Figure 24:
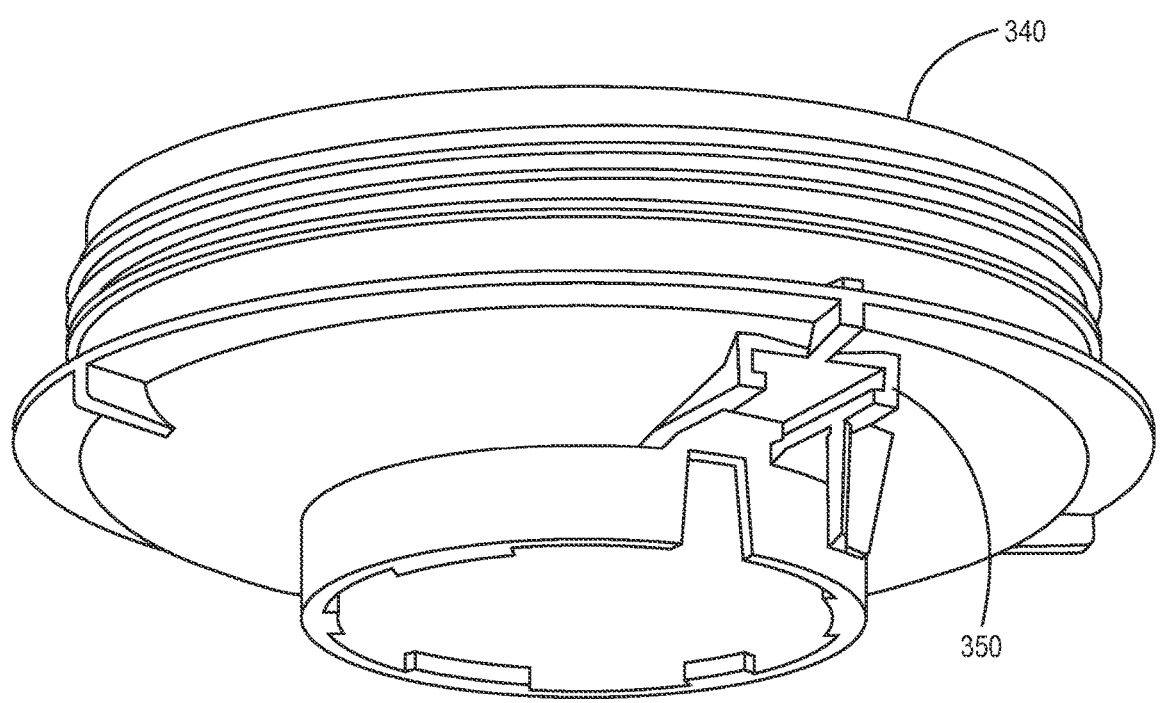

FIG. 24 is a bottom view the bottom plate of a filter element constructed in accordance with an implementation of the invention.

Figure 25A:
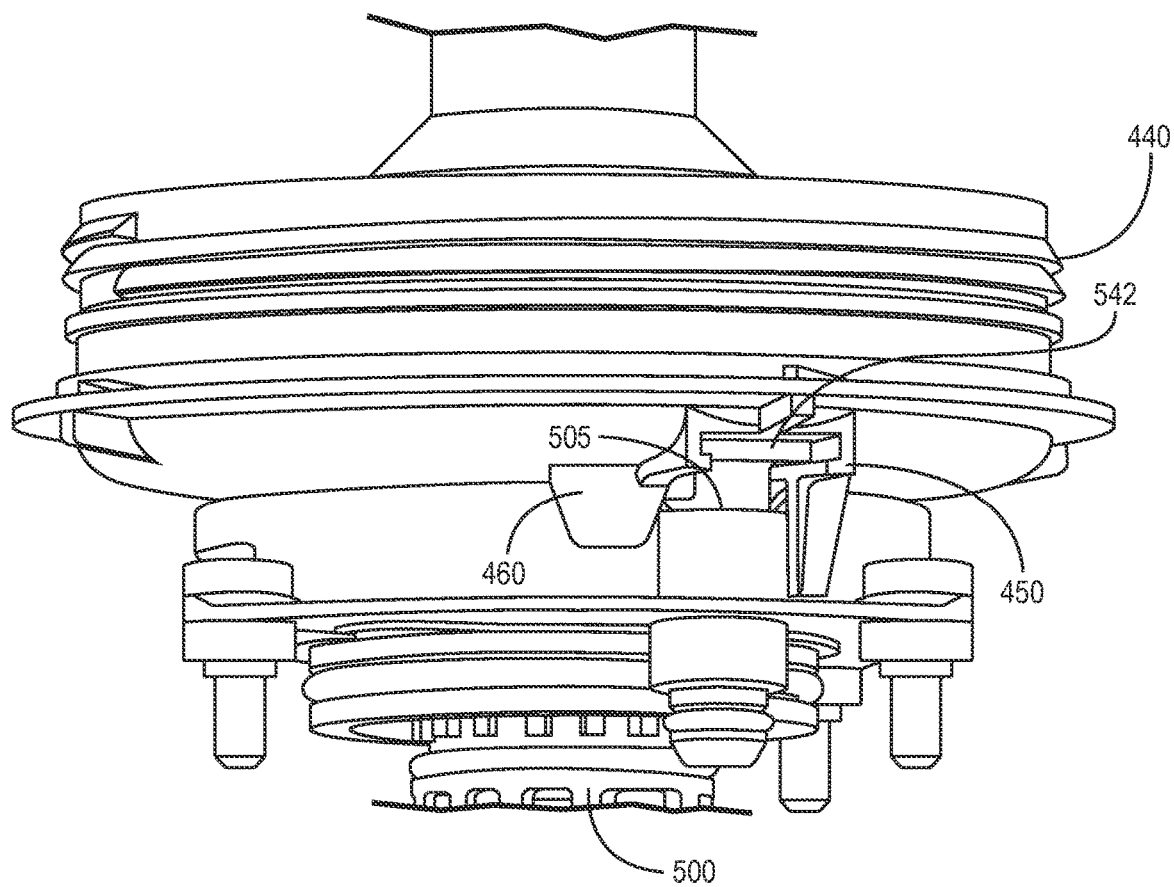

FIG. 25A a partial side view of portions of a sealing filter constructed and arranged in accordance with an implementation of the invention, showing the bottom plate and standpipe on which it is installed.

Figure 25B:
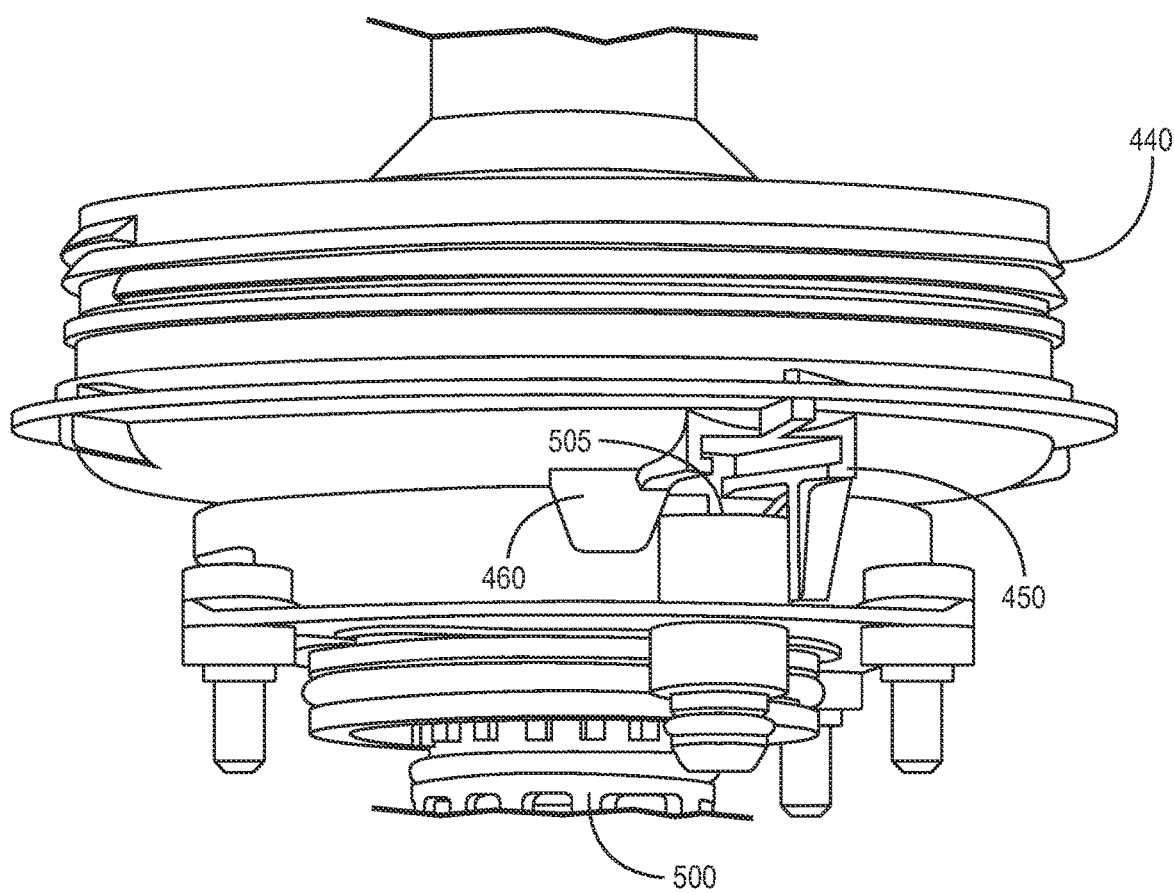

FIG. 25B a partial side view of portions of a sealing filter constructed and arranged in accordance with an implementation of the invention, showing the bottom plate and standpipe on which it is installed, but with sealing members removed for illustrative purposes.

Figure 26:
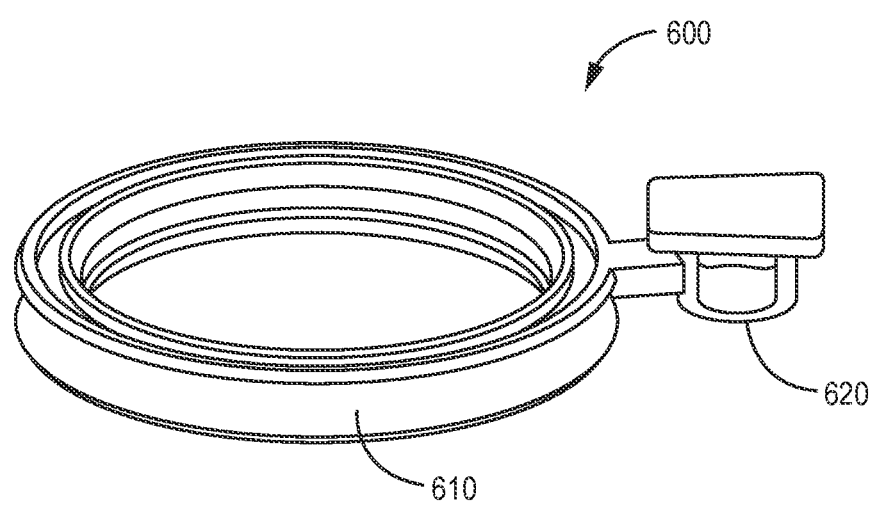

FIG. 26 is an example drain seal element constructed and arranged in accordance with an implementation of the invention.

Figure 27:
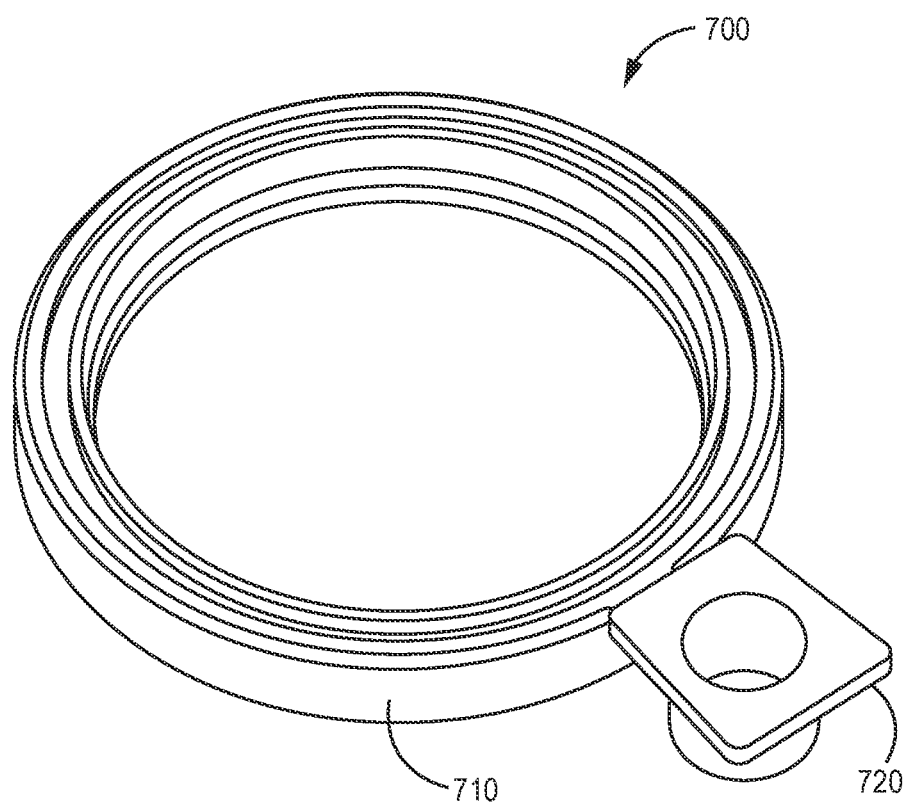

FIG. 27 is an example drain seal element constructed and arranged in accordance with an implementation of the invention.

Figure 28:
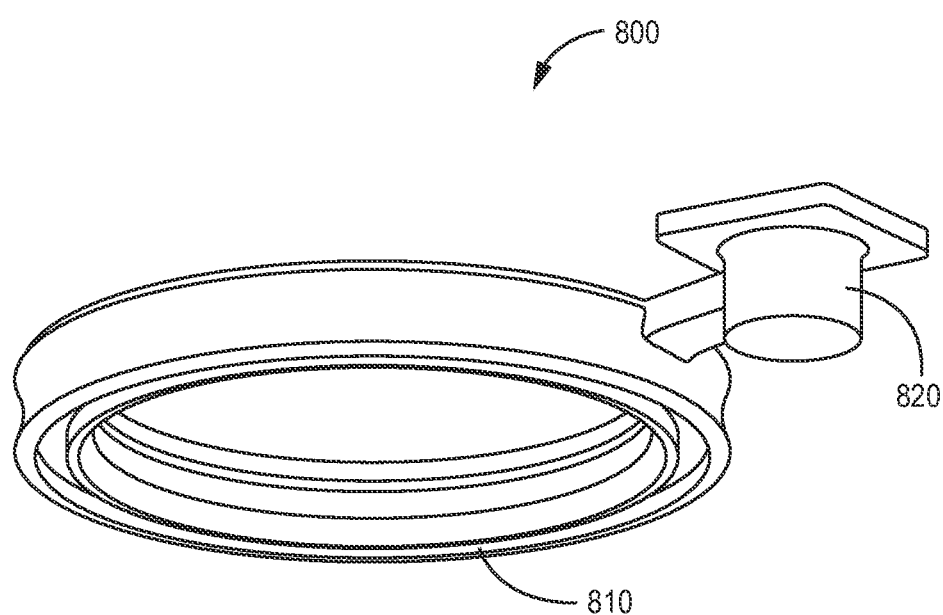

FIG. 28 is an example drain seal element constructed and arranged in accordance with an implementation of the invention.

Figure 29:
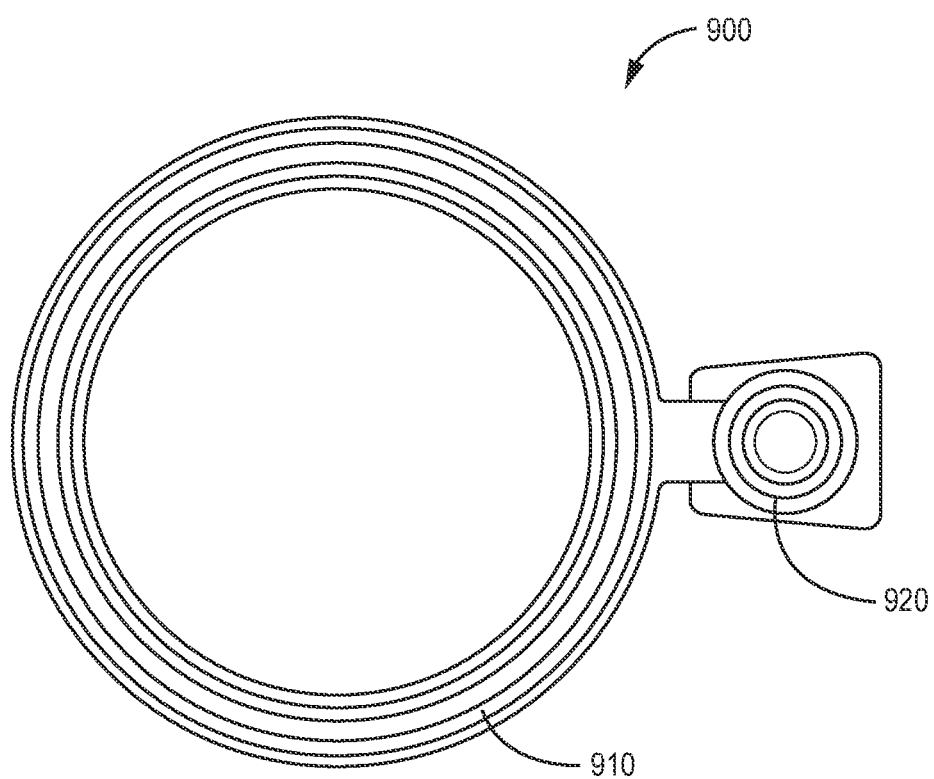

FIG. 29 is an example drain seal element constructed and arranged in accordance with an implementation of the invention.

Figure 30:
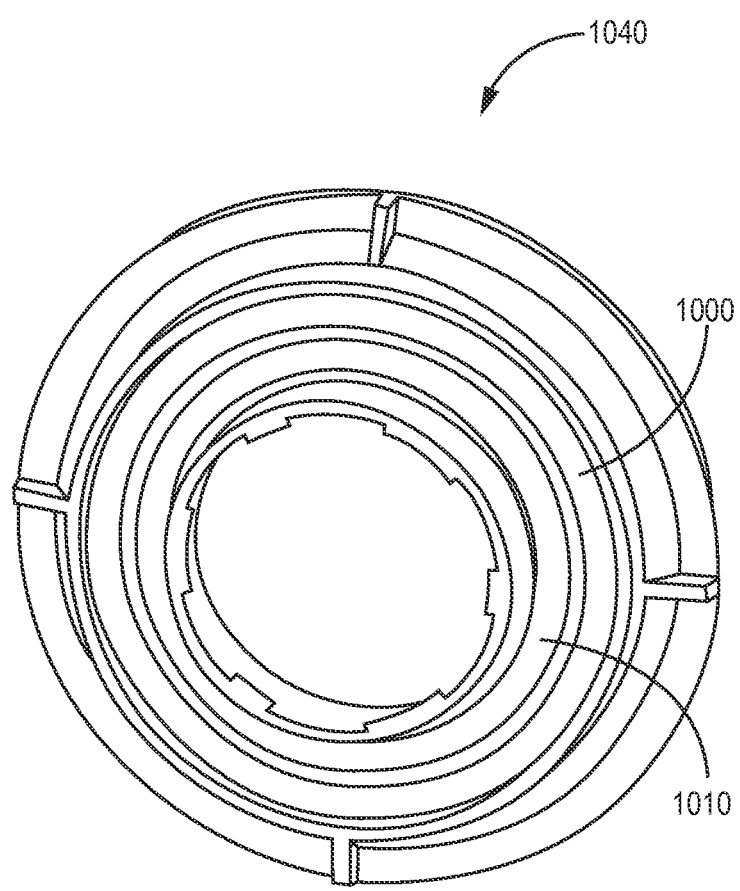

FIG. 30 is a bottom view of a portion of a filter element base plate, showing a double seal construction.

Figure 31:
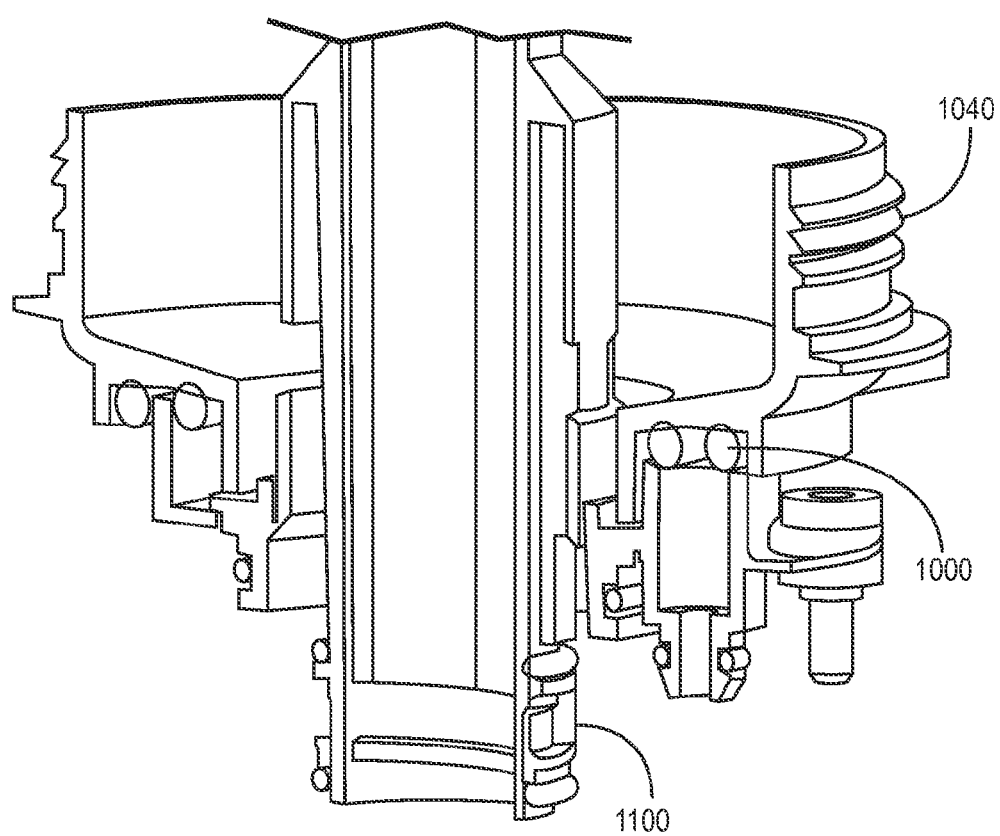

FIG. 31 is partial sectional view of a filter element base plate and standpipe, showing a double seal in cross section.

Figure 32:
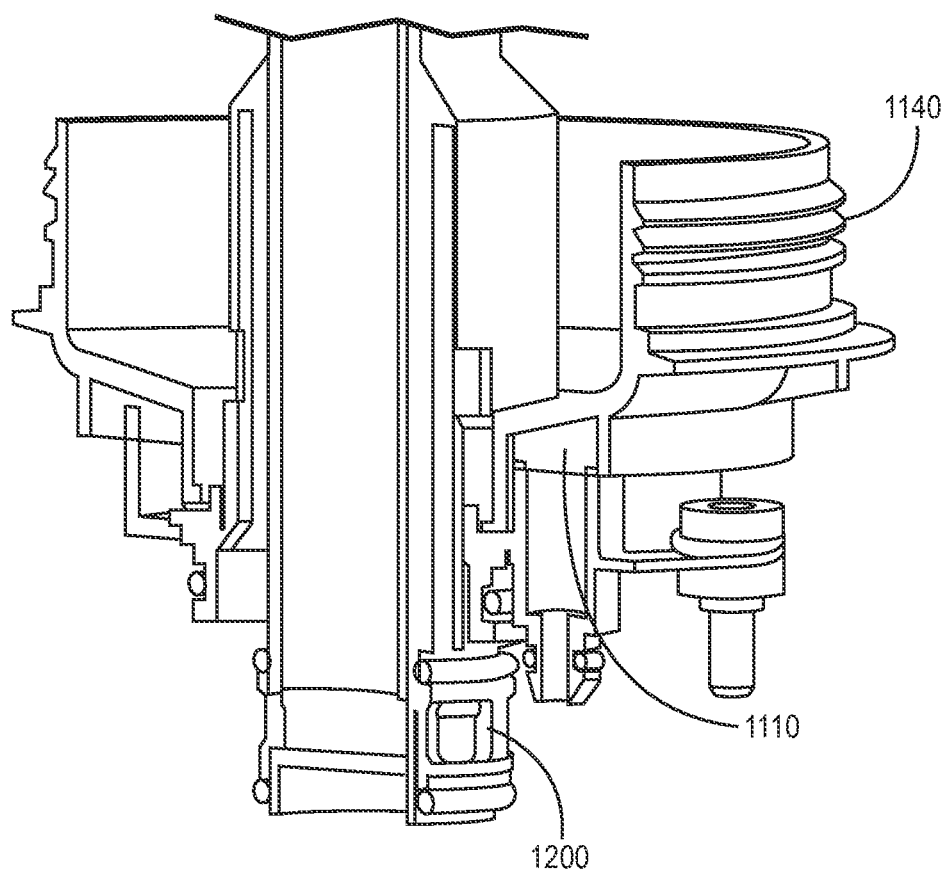

FIG. 32 is a partial sectional view of a filter element and standpipe, showing a single seal in cross section.

Figure 33:
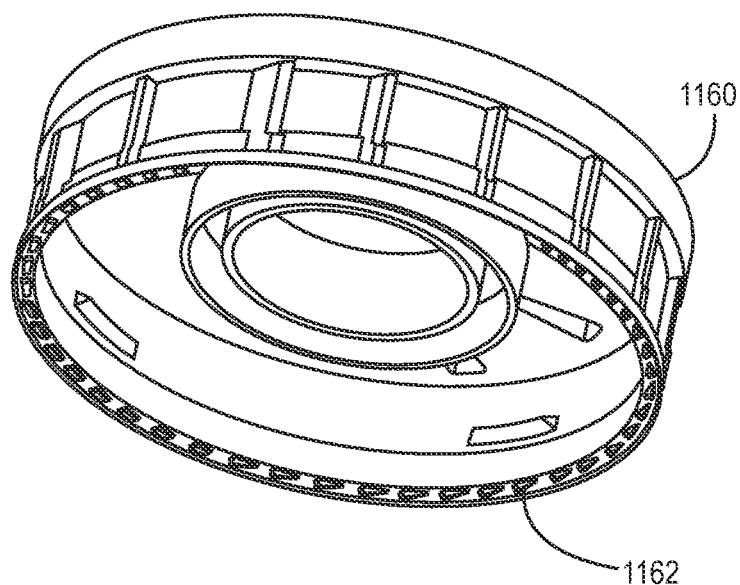

FIG. 33 is a partial view of an end cap constructed and arranged in accordance with an implementation of the in invention.

Figure 34:
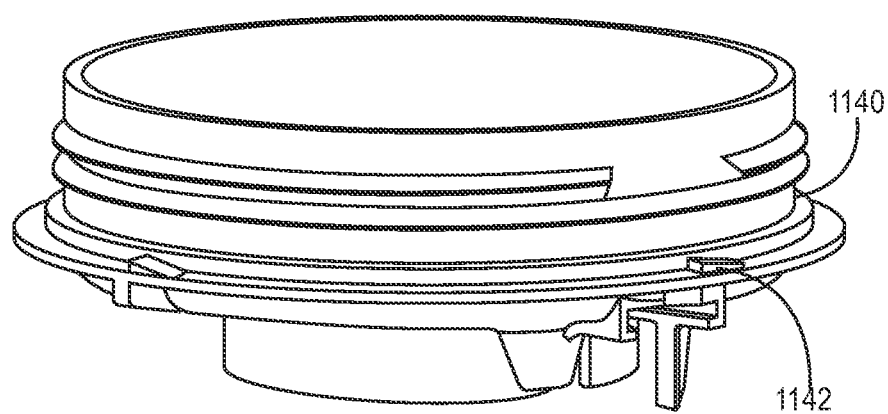

FIG. 34 is a partial view of a base plate constructed and arranged in accordance with an implementation of the in invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed to fuel filters, in particular fuel filters configured to remove particulate contamination while also separating water from the fuel. Certain embodiments are directed to a filter element for filtration of fuel, the filter element comprising a first filter stage surrounding at least a majority of an open central volume; a second filter stage disposed within the first stage and surrounding at least a portion of the open central volume; and a third stage comprising at least one hydrophobic filter disposed downstream of the second stage. The first and second stage filter media are optionally combined together in the alternate versions, allowing for elimination of the second stage.

Figure 1:
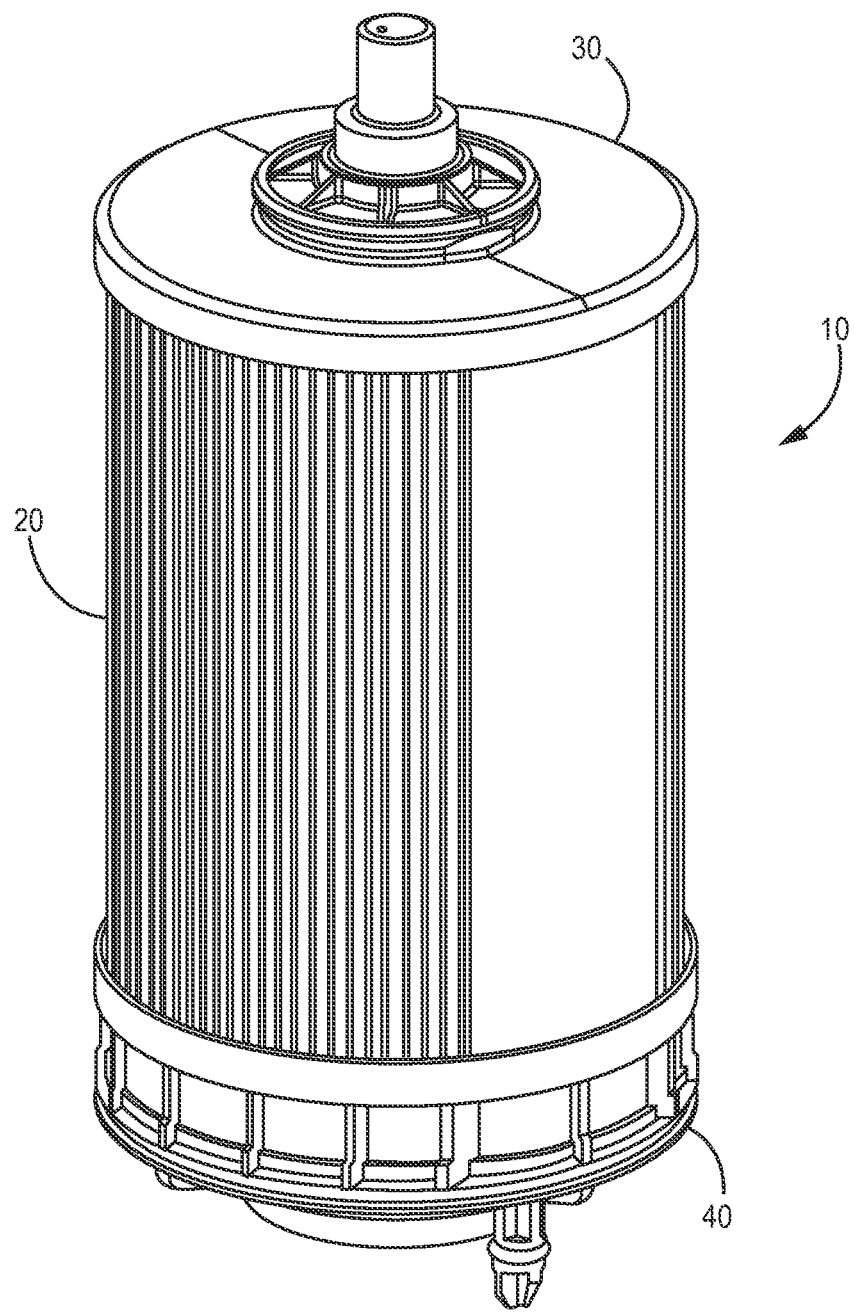
FIG. 1 is a perspective view of a filter element constructed and arranged in accordance with an implementation of the invention.

Referring now to the drawings, FIG. 1 is a perspective view of a filter element 10 constructed and arranged in accordance with an implementation of the invention. The filter element 10 includes, in the depicted embodiment, pleated filtration media 20. Also depicted is a top end cap 30, and a bottom plate 40.

Figure 2A:
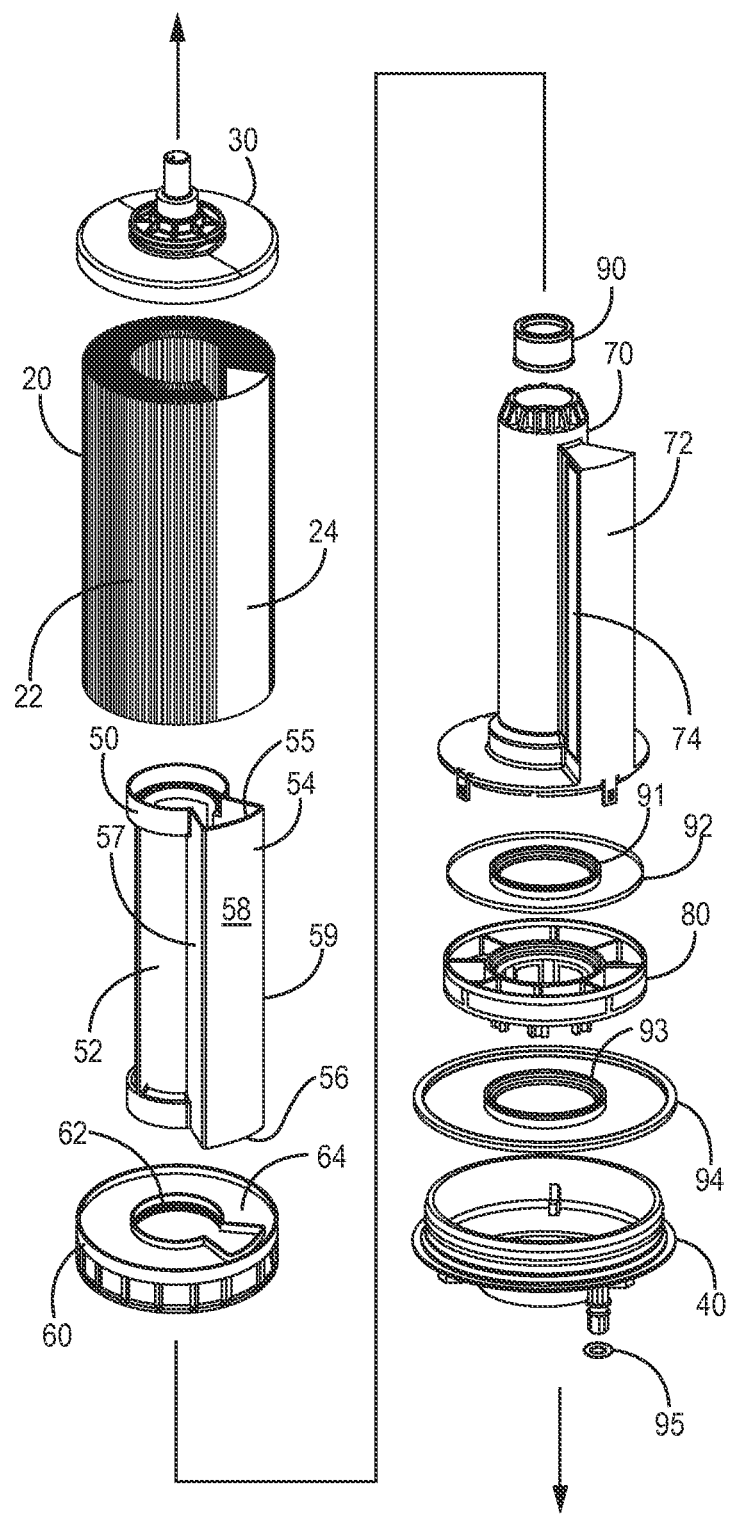
FIG. 2A is an exploded perspective view of components forming a filter element constructed and arranged in accordance with an implementation of the invention.

FIG. 2A is an exploded perspective view of a portion of the components forming a filter element 10 constructed and arranged in accordance with an implementation of the invention. The filter element 10 includes an outer layer of filter media 20. The filter media 20 typically includes pleats forming pleated portion 22, and can also optionally contain a non-pleated portion 24. Fuel flowing through the filter element 10 typically flows from the exterior to the interior of filter media 20 of the filter element 10, primarily through the pleated portion 22. Some fuel can also flow through the non-pleated portion 24, but such flow is typically significantly less than that through the pleated portion 24.

Positioned within the first filter media 20 is an inner liner and flow director 50. The inner liner and flow director 50 includes second filter media 52. This second filter media 52 is selected to coalesce water present within fuel flowing through the filter element 10. The inner liner and flow director 50 also includes a flow channel 54 configured to direct fluid, primarily fuel and coalesced water that has passed through the second filter media 52. Typically this flow channel 54 is open along an interior side. The top 55 and bottom 56 of the flow channel 54 are open, although the top is typically sealed by the top end cap 30 with potting compound and the bottom 56 in endcap 60. The media can alternatively be adhered to the end caps with a thermal bonding process or other process, including a combination of various processes. The sides 57, 58, 59 of the flow channel are typically solid surfaces that do not permit the flow of fluid across them. The bottom 56 of the flow channel 54 is generally open, as will be described below, to permit flow of collected water out through bottom end cap 60.

The inner liner and flow director 50 fits over a bottom end cap 60. In certain embodiments the bottom end cap 60 has an opening 62 corresponding substantially to the outline of the inner liner and flow director 50. Typically a potting compound is located at the top surface 64 of the bottom end cap 60, the potting compound serving to secure the bottom of the filter media 20 and the lower edges of the inner liner and flow director 50.

In the depicted embodiment, positioned within the inner liner and flow director 50 is a core manifold 70 and separator 72. The separator 72 includes a hydrophobic material 74 configured to separate fuel and coalesced water. The fuel is able to flow relatively easily through the hydrophobic material 74, while coalesced water collects and travels down the hydrophobic material 74. They hydrophobic material is elevated to be less susceptible to water buildup The core manifold 70 and separator 72 are positioned within the inner liner and flow director 50, and also positioned above a bottom member 80. Typically the core manifold 70 and separator 72 are secured to this bottom member 80, which in turn is positioned on a bottom plate 40.

The various components are sealed with regard to one another (and the housing, not shown), by way of various seals, including seals 90, 91, 92, and 93 (to seal with a standpipe on the housing, not shown), and seal and 94.

During operation, fuel flows into a filter housing, and then through filter media 20. After flowing through filter media 20, it travels through the second filter media 52, where at least a portion of water within the fuel is typically coalesced. After passing through the second filter media 52, the fuel and coalesced water travels between the second filter media 52 and the core manifold 70 into a gap between the flow channel 54 and the separator 72. The fuel is then able to pass through the hydrophobic material 74 and into the interior of the core manifold 70 (from where it subsequently travels out of the filter element), while coalesced water is generally retained on the outside of the hydrophobic material 74 and down through the hole 62 in the end cap 60 to bottom member 80 and into bottom plate 40, from where it can be removed separate from the filtered fuel. The water has a separate or different flow path than the filtered fuel.

Figure 3A:
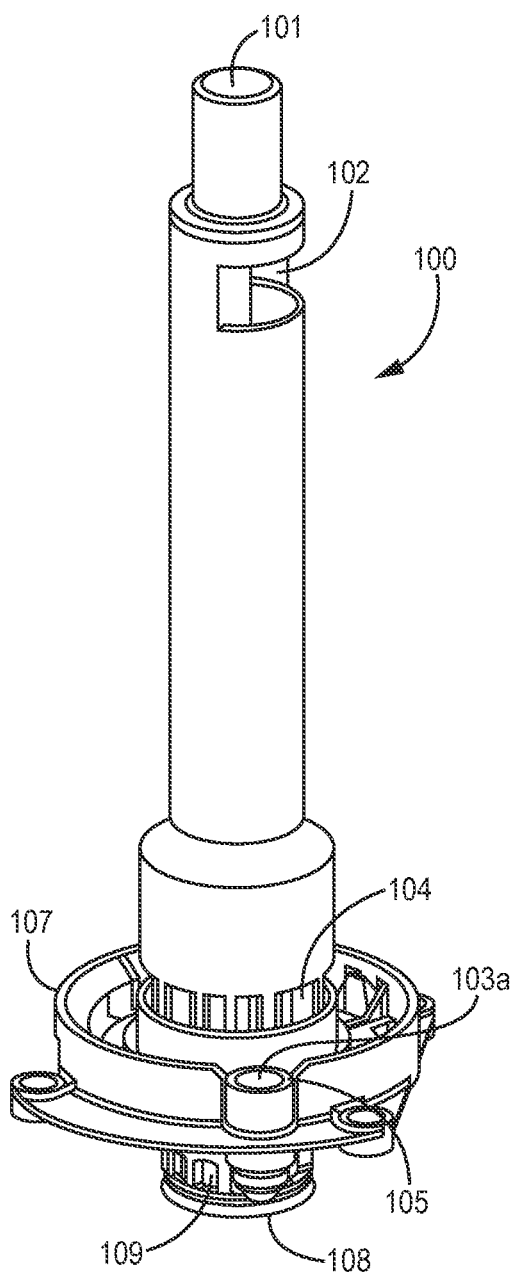
FIG. 3A is a perspective view of a standpipe from a housing, the standpipe configured to receive a filter element constructed and arranged in accordance with an implementation of the invention.

The flow of the fuel and water out of the filter element is typically controlled by a central standpipe onto which the filter element 10 is mounted. The standpipe is located within the filter housing onto which the filter element 10 is installed. An example of such a standpipe assembly 100 is depicted in FIG. 3A. In use, fuel to be filtered passes through element 10 and then down through standpipe assembly 100. In typical use the filter element 10 is removed from the housing after use, leaving behind the standpipe assembly 100, which is secured within the housing.

Figure 2B:
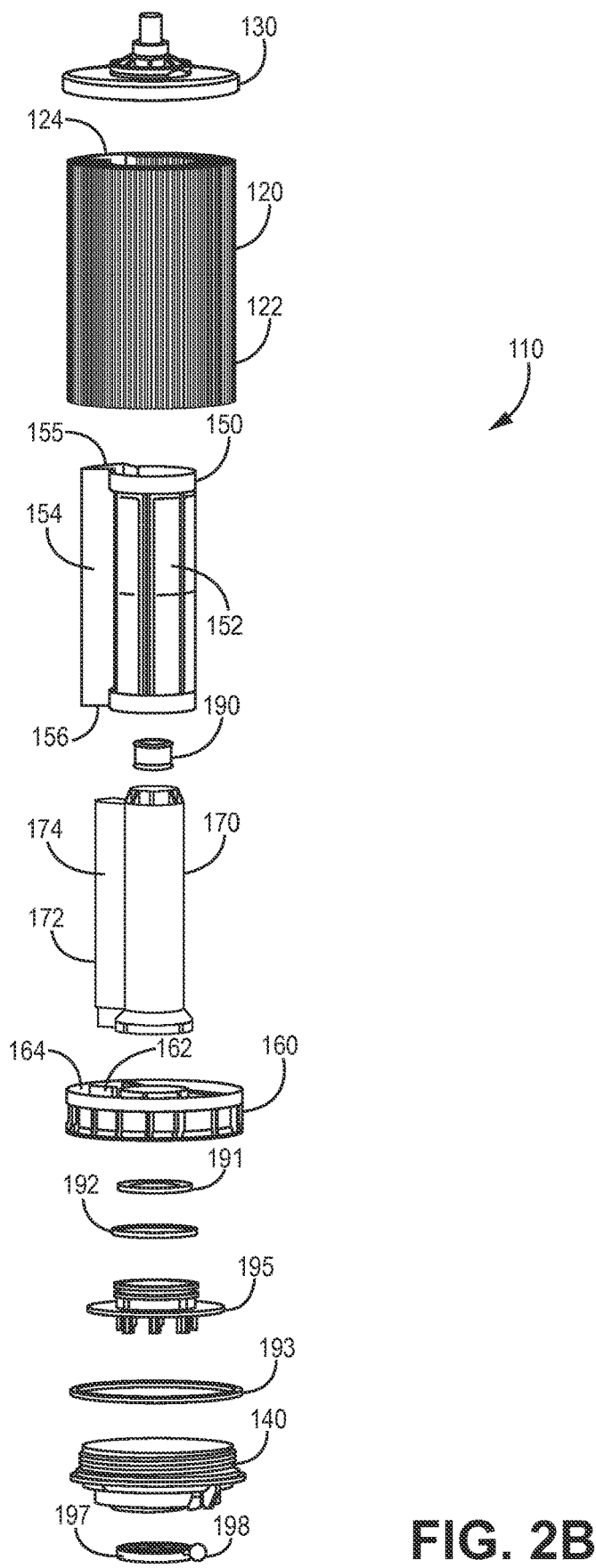
FIG. 2B is an exploded perspective view of components forming a filter element constructed and arranged in accordance with an alternative implementation of the invention from that shown in FIG. 2A.

FIG. 2B is an exploded perspective view of a portion of the components forming a filter element constructed and arranged in accordance with an alternative implementation of the invention, in which a core manifold is secured to a bottom end cap with a potting compound, as opposed to passing through the bottom of end cap 80 as shown in the embodiment depicted in FIG. 2A. The filter element 110 includes an outer layer of filter media 120. The filter media 120 typically includes pleats forming pleated portion 122, and can also optionally contain a non-pleated portion 124. Fuel flowing through the filter element 110 typically flows from the exterior to the interior of filter media 120 of the filter element 110, primarily through the pleated portion 122. Some fuel can also flow through the non-pleated portion 124, but such flow is typically significantly less than that through the pleated portion 124.

Positioned within the first filter media 120 is an inner liner and flow director 150, which also functions to secure coalescing material, provides pleat support and stabilization, and serves as a flow director. The inner liner and flow director 150 includes second filter media 152. This second filter media 152 is selected to coalesce water present within fuel flowing through the filter element 110. In the depicted embodiment the second filter media 152 is secured as panels around at least a portion of the circumference of the inner liner and flow director 150, such as by sonic welding or overmolding The inner liner and flow director 150 also includes a flow channel 154 configured to direct fluid, primarily fuel and coalesced water that has passed through the second filter media 152. Typically this flow channel 154 is open along an interior side. The top 155 and bottom 156 of the flow channel 154 are open, although the top 155 is typically sealed by the top end cap 130 and potting compound. The sides of the flow channel are typically solid surfaces that do not permit the flow of fluid across them. The bottom 156 of the flow channel 154 is generally open, as will be described below, to permit flow of collected water out through bottom end cap 160.

The inner liner and flow director 150, which also functions as a media pleat support, fits over a bottom end cap 160. In certain embodiments the bottom end cap 160 has an opening (not marked) corresponding substantially to the outline of the inner liner and flow director 150. Typically a potting compound is located at the top surface 164 of the bottom end cap 60, the potting compound serving to secure the bottom of the filter media 120 and the lower edges of the inner liner and flow director 150 to the top surface 164 of the bottom end cap 160. Other bonding methods besides potting compounds can also be used.

In the depicted embodiment, positioned within the inner liner and flow director 150 is a core manifold 170 and separator 172. The separator 172 includes a hydrophobic material 174 configured to separate fuel and coalesced water. The fuel is able to flow relatively easily through the hydrophobic material 174, while coalesced water collects and travels down the hydrophobic material 174. In the some embodiments only a portion of the separator 172, measuring vertically, has hydrophobic material 174. Thus, for example, in some embodiments only upper portions of the separator 172 contains hydrophobic material 174, while in other implementations only lower portions of the separator 172 contains hydrophobic material 174. Some implementations have hydrophobic material in a confined area, internal area and not along the whole length of the filter.

The various components are sealed with regard to one another (and the housing, not shown), by way of various seals, including seal 190 (to seal with a standpipe on the housing, not shown), and seals 191, 192, and 193. An inner element 195 is shown in the depicted embodiment, the inner element providing structure within bottom cover 140.

Also depicted in FIG. 2B is a seal element 197, typically made of an elastomeric material, including a sealing element 198, for sealing over a housing drain in the standpipe assembly (not shown)

During operation, fuel flows into a filter housing, and then through filter media 120. After flowing through filter media 120, it travels through the second filter media 152, where at least a portion of water within the fuel is typically coalesced. After passing through the second filter media 152, the fuel and coalesced water travels between the second filter media 152 and the core manifold 170 into a gap between the flow channel 154 and the separator 172. The fuel is then able to pass through the hydrophobic material 174 and into the interior of the core manifold 170 (from where it subsequently travels out of the filter element), while coalesced water is generally retained on the outside of the hydrophobic material 174 and down through a hole or holes 162 in the end cap 160 to bottom member 80 and into bottom cover 140, from where it can be removed separate from the filtered fuel.

Figure 3B:
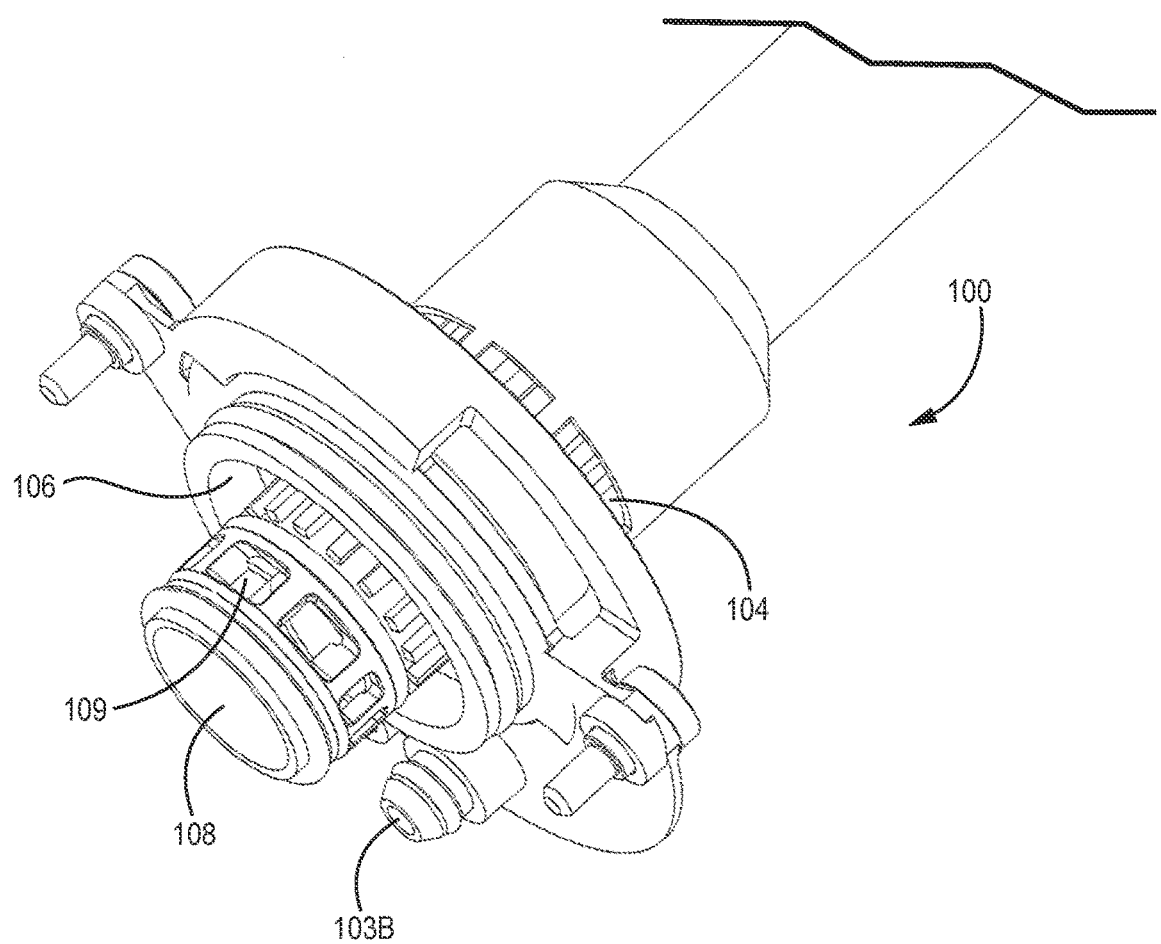
FIG. 3B is a partial lower perspective view of a standpipe from a housing, the standpipe configured to receive a filter element constructed and arranged in accordance with an implementation of the invention.

The flow of the fuel and water out of the filter element is typically controlled by a central standpipe onto which the filter element 110 is mounted. The standpipe is located within the filter housing onto which the filter element 110 is installed. An example of such a standpipe assembly 100 is depicted in FIG. 3A and FIG. 3B. In use fuel to be filtered passes through elements 10 or 110 and then down through standpipe assembly 100. In typical use the filter elements 110 or 110 are removed from the housing after use, leaving behind the standpipe assembly 100, which is secured within the housing.

As will be explained in greater detail below, and in reference to FIGS. 3A and 3B, fuel flowing through the filter element passes through opening 102 in the standpipe assembly 100, down the length of standpipe assembly 100, and then out though the bottom opening 108 of the standpipe assembly 100. Water contained within the fuel is separated from the fuel by the filter element at the separator. This water is collected in the lower portion of the element 10, and passes into the standpipe at a second opening 104 in the standpipe assembly 100, and then out through opening 106 at the bottom of the standpipe assembly 100. In the embodiment depicted, the standpipe assembly 100 is constructed such that filtered fuel travels out the center of the standpipe assembly 100 at the opening 108, while the separated water flows out from the perimeter of the standpipe at opening 106. Air passes out through opening 109 (after entering standpipe 100 through bleed hole 101 at the top of the standpipe 100). Thus bleed hole 101 and opening 109 are connected along the length of standpipe 100.

Also shown in FIG. 3B is housing drain 103b, which allows for unfiltered fuel to flow out of the housing upon removal of a filter element from housing, such as during changing of filter elements. This housing drain 103b is typically plugged on the opposite side at drain 103a (see FIG. 3A) when a filter element is in place, such as by seal member 95 (see FIG. 2A) or sealing element 198 (see FIG. 2B). drain 103a When a filter element is installed on the standpipe assembly 100, a seal on the bottom of the element closes drain 103a, preventing fuel from flowing back into the fuel tank. When the filter element is being removed this drain 103a is opened, allowing unfiltered fuel remaining within the housing to drain back to the fuel tank. This construction helps prevents unfiltered fuel within the housing from inadvertently mixing with filtered fuel during removal or servicing of the filter element.

Also depicted in FIG. 3A is a lip 105 surrounding the drain 103a. This lip 105 can be engaged by a seal on the bottom of a filter element to prevent flow of fuel back to the fuel tank during normal use, and it is this lip 105 that the seal on the bottom of the element can disengage when being removed from the housing, thereby allowing unfiltered fuel to flow back to the fuel tank rather than mixing with filtered fuel.

A further feature of standpipe assembly 100 is a ridge 107 extending around the base of the standpipe assembly 100. In the embodiment shown, the ridge 107 extends around nearly the full circumference of the standpipe assembly 100, except for a portion where the drain 103a and drain lip 105 are positioned. Thus, the drain 103a and drain lip 105 can be positioned so as to intersect the circumferential path of the ridge 107 around the base of the standpipe assembly 100, with a portion of the lip 105 extending radially inward of the ridge 107 and a portion of the lip 105 extending radially outward of the ridge 107. It will be understood that other alternative arrangements can be provided for flow out of the standpipe. However, typically the fuel flow is significantly greater than the flow of separated water.

Figure 4A:
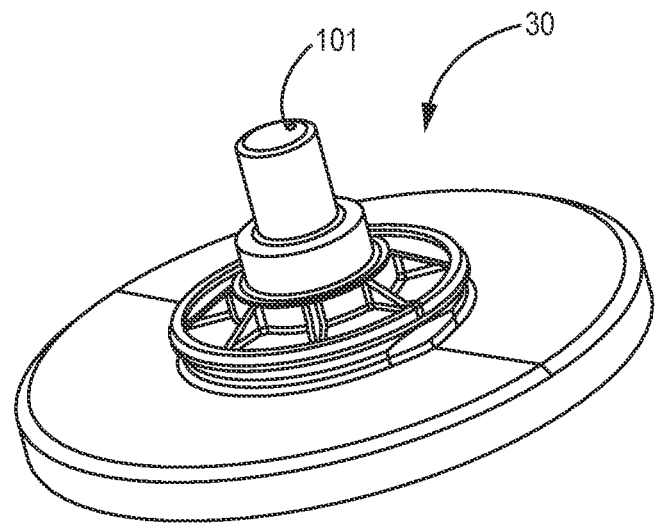
FIG. 4A is a top perspective view of a top end cap from a filter element constructed and arranged in accordance with an implementation of the invention.
Figure 4B:
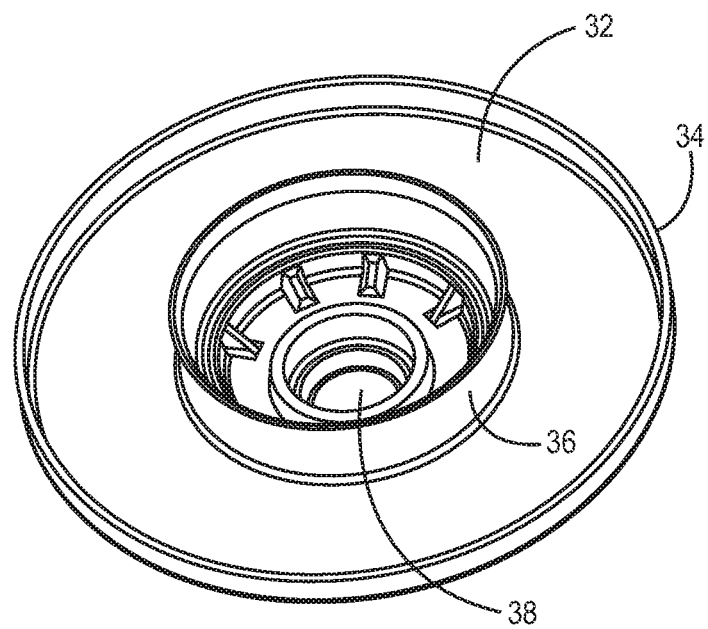
FIG. 4B is a bottom perspective view of a top end cap from a filter element constructed and arranged in accordance with an implementation of the invention.

Reference to further aspects of the various components will now be made. These descriptions of the components describe aspects of an example filter element, without intending to be limiting to the described aspects. First, with regard to FIGS. 4A and 4B, top and bottom perspective views of a top end cap 30 are shown, depicting bleed hold 101. The top end cap 30 includes, in the depicted embodiment, an inside bonding region 32 for receiving the ends of pleats of pleated media 20 (not shown), the potting region 32 is configured to receive a potting compound to secure and seal the pleat edges. An outer lip 34 and inner lip 36 help prevent potting compound from excessively escaping from the potting region 32. In addition, in the embodiment shown, the top end cap 30 shows an interior depression 38 for receiving a seal 90 (see FIG. 2) and the top of the standpipe 100 (see FIG. 3A).

Figure 5A:
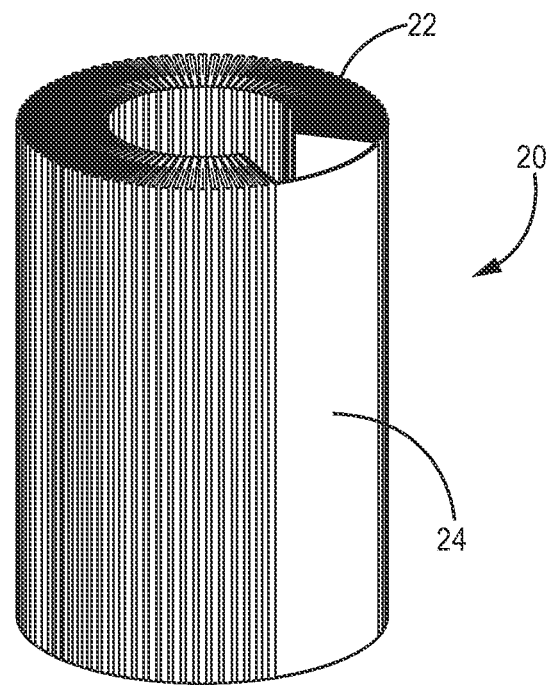
FIG. 5A is a perspective view of an example filter media pack from a filter element constructed and arranged in accordance with an implementation of the invention.
Figure 5B:
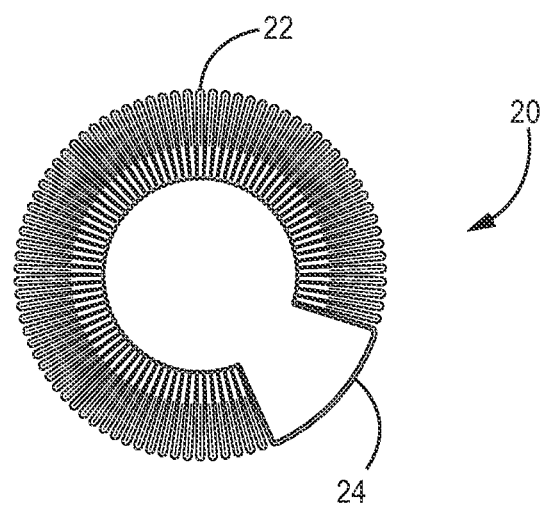
FIG. 5B is a top view of an example filter media pack from a filter element constructed and arranged in accordance with an implementation of the invention.

With regard to the first media material, FIG. 5A is a perspective view of an example filter media pack from a filter element constructed and arranged in accordance with an implementation of the invention. FIG. 5B is a top view of an example filter media pack from a filter element constructed and arranged in accordance with an implementation of the invention. Optionally the first filter stage comprises a first media portion comprising radially pleated media, and a second media portion comprising non-pleated media. In some embodiments the first filter stage surrounds a majority of the open central volume. The first filter stage can include, for example, a multi-layer filter media designed to remove hard particles from the fuel. The filter media 20 typically includes pleats forming pleated portion 22, and can also optionally contain a non-pleated portion 24. Fuel flowing through the filter element 10 typically flows from the exterior to the interior of the filter element 10, primarily through the pleated portion 22. Some fuel can also flow through the non-pleated portion 24, but such flow is typically significantly less than that through the pleated portion 24.

Figure 6A:
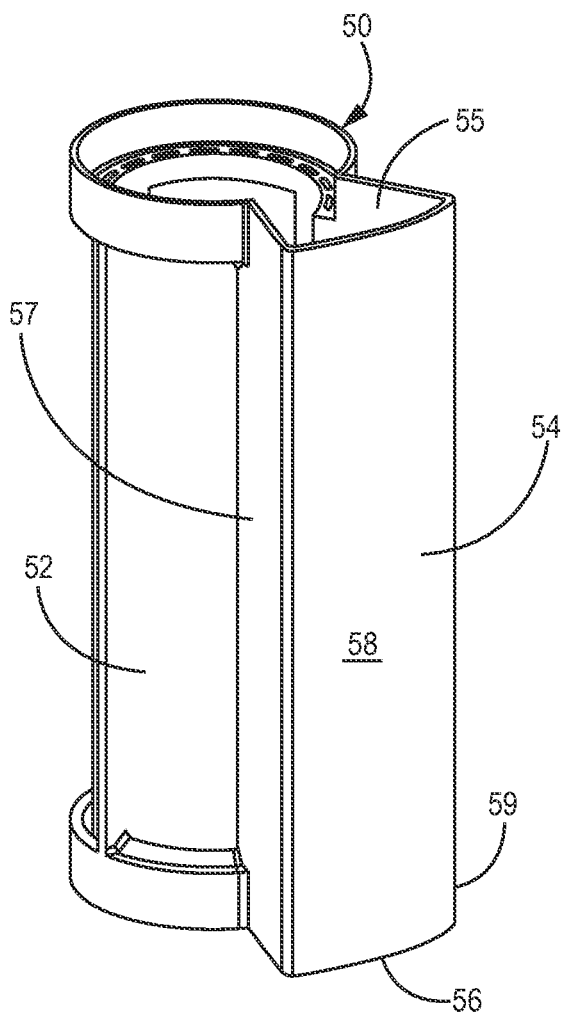
FIG. 6A is a perspective view of an inner liner and flow director from a filter element constructed and arranged in accordance with an implementation of the invention.
Figure 6B:
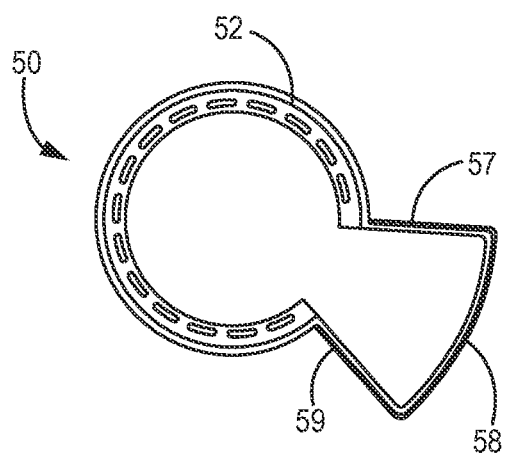
FIG. 6B is a top view of an inner liner and flow director from a filter element constructed and arranged in accordance with an implementation of the invention.

FIG. 6A is a perspective view of an inner liner and flow director from a filter element constructed and arranged in accordance with an implementation of the invention. FIG. 6B is a top view of an inner liner and flow director from a filter element constructed and arranged in accordance with an implementation of the invention. The inner liner and flow director 50 includes second filter media 52. This second filter media 52 is selected to coalesce water present within the fuel flowing through the filter element 10. The inner liner and flow director 50 also includes a flow channel 54 configured to direct fluid, primarily fuel and coalesced water, that has passed through the second filter media 52. The flow director configured to direct fluid flow toward the perimeter of the filter element after it has passed through the second filter stage. In some embodiments the flow director 54 is positioned substantially outside the radius formed by the second filter media 52. The flow director 54 is positioned within the first filter media 20 in example implementations. Typically this flow director 54 is open along an interior side. The top 55 and bottom 56 of the flow director 54 are open, although the top 55 is typically sealed by the top end cap 30 and potting compound. The sides 57, 58, 59 of the flow channel are typically solid surfaces that do not permit the flow of fluid across them. The bottom 56 of the flow channel 54 is generally open, as was described above, to permit flow of collected water out through bottom end cap 60.

Figure 7:
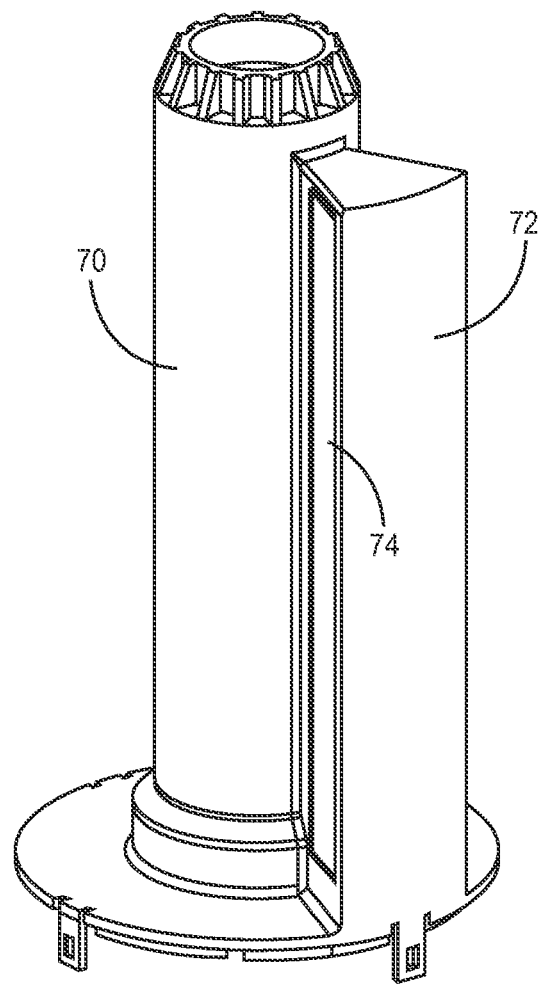
FIG. 7 is a perspective view of a core manifold and separator from a filter element constructed and arranged in accordance with an implementation of the invention.

FIG. 7 is a perspective view of a core manifold 70 and separator 72 from a filter element 10 constructed and arranged in accordance with an implementation of the invention. The core manifold 70 and separator 72 are generally positioned within the inner liner and flow director 50. The separator 72 is includes a hydrophobic material 74 configured to separate fuel and coalesced water. Fuel is able to flow relatively easily through the hydrophobic material 74, while coalesced water collects and travels down the hydrophobic material 74. The separator 72 can include a hydrophobic mesh material. The separator 72 may be constructed and arranged such that fluid flow at the hydrophobic mesh is substantially tangential. In some configurations the separator 72 comprises hydrophobic media oriented substantially along a plane parallel to the central axis of the filter element. The separator 72 may include hydrophobic media oriented along an arc along a portion of the central volume.

The hydrophobic material 74 extends, in various implementations, over a range of less than 5 to no more than 180 degrees of an arc around the central volume. In certain embodiments the hydrophobic material 74 is disposed entirely on one side of a plane containing a longitudinal axis of the filter element. A separator can disposed on an opposite side of the plane containing a longitudinal axis of the filter element from the first separator 72. Additional separators can also be located within the filter element.

In some constructions at least one separator 72 extends in an axial direction along a path adjacent to the second filter stage for at least a portion of the axial length of the second stage. Hydrophobic material 74 extends along less than the full axial length of the separator 72 in some embodiments, and extends along the full axial length of the separator in other embodiments.

In various constructions the separator 72 includes a fluid flow surface extending in a radial direction. The separator 72 can in addition, or alternatively, include a fluid flow surface extending in circumferential direction. In some embodiments the separator 72 extends over less a range of no less than 5 to no more than 180 degrees of an arc around the central volume.

Figure 8A:
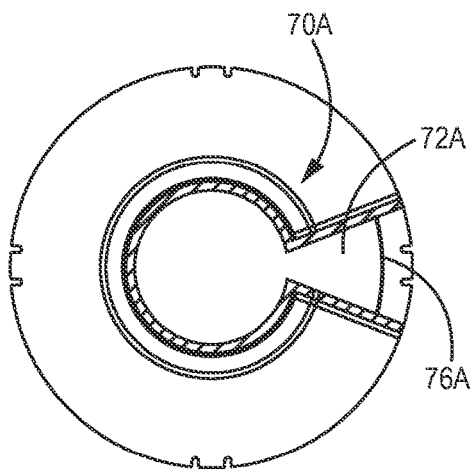
FIG. 8A is a top cross sectional view of a portion of a filter element constructed and arranged in accordance with an implementation of the invention, the cross sectional view showing a core manifold and separator.

FIG. 8A is a top cross sectional view of a portion of a filter element constructed and arranged in accordance with an implementation of the invention, the cross sectional view showing a core manifold 70A and separator 72A. The separator 72A includes a single panel of hydrophobic material 76A.

Figure 8B:
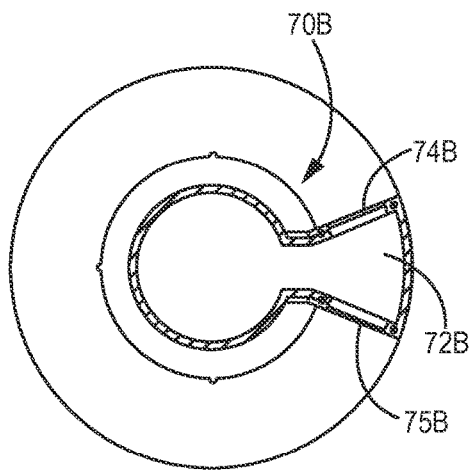
FIG. 8B is a top cross sectional view of a portion of a filter element constructed and arranged in accordance with an implementation of the invention, the cross sectional view showing a core manifold and separator.

FIG. 8B is a top cross sectional view of a portion of a filter element constructed and arranged in accordance with an implementation of the invention, the cross sectional view showing a core manifold 70B and separator 72B. The separator 72B includes two panels of hydrophobic material 74B and 75B.

Figure 8C:
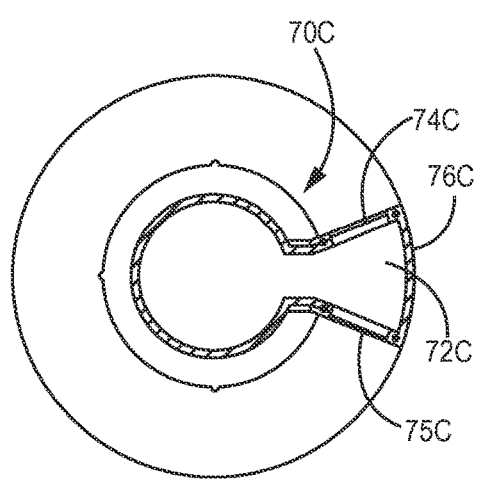
FIG. 8C is a top cross sectional view of a portion of a filter element constructed and arranged in accordance with an implementation of the invention, the cross sectional view showing a core manifold and separator.

FIG. 8C is a top cross sectional view of a portion of a filter element constructed and arranged in accordance with an implementation of the invention, the cross sectional view showing a core manifold 70C and separator 72C. The separator 72C includes three panels of hydrophobic material 74C, 75C, and 76C.

Figure 8D:
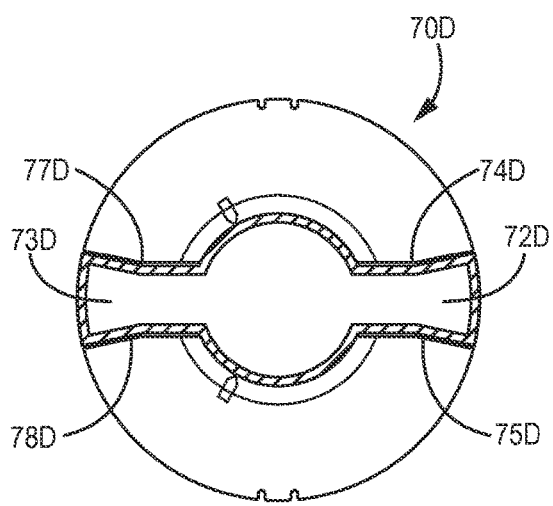
FIG. 8D is a top cross sectional view of a portion of a filter element constructed and arranged in accordance with an implementation of the invention, the cross sectional view showing a core manifold and two separators.

FIG. 8D is a top cross sectional view of a portion of a filter element constructed and arranged in accordance with an implementation of the invention, the cross sectional view showing a core manifold 70D and two separators 72D and 73D. The separators include four panels of hydrophobic material 74D, 75D, 77D, and 78D.

FIG. 9A is a top perspective view of a bottom end cap 60 from a filter element constructed and arranged in accordance with an implementation of the invention. FIG. 9B bottom perspective view of a bottom end cap 60 from a filter element constructed and arranged in accordance with an implementation of the invention. The bottom end cap 60 has an opening 62 corresponding substantially to the outline of the inner liner and flow director 50. Typically a potting compound is located at the top surface 64 of the bottom end cap 60, the potting compound serving to secure the bottom of the filter media 20 and the lower edges of the inner liner and flow director 50.

FIG. 9C is a top perspective view of a bottom end cap 360 from a filter element constructed and arranged in accordance with an implementation of the invention. FIG. 9D bottom perspective view of a bottom end cap 360 from a filter element constructed and arranged in accordance with an implementation of the invention. The bottom end cap 360 has an opening 362 corresponding substantially to the outline of the inner liner, plus two additional openings 363 for receiving coalesced water. Typically a potting compound is located at the top surface 364 of the bottom end cap 360, the potting compound serving to secure the bottom of the filter media and the lower edges of the inner liner and flow director.

FIG. 9E is a top perspective view of a bottom end cap 460 from a filter element constructed and arranged in accordance with an implementation of the invention. FIG. 9F bottom perspective view of a bottom end cap 460 from a filter element constructed and arranged in accordance with an implementation of the invention. The bottom end cap 460 has an opening 462 corresponding substantially to the outline of the inner liner, plus an additional opening 463 for receiving coalesced water. Typically a potting compound is located at the top surface 464 of the bottom end cap 460, the potting compound serving to secure the bottom of the filter media and the lower edges of the inner liner and flow director.

FIG. 10A is a side view of bottom cover 40 from a filter element constructed and arranged in accordance with an implementation of the invention. FIG. 10B is a bottom perspective view of the bottom cover 40. A rotational alignment projection 42 extends from the bottom cover 40. The rotational alignment projection 42 can include a seal member 95. This seal member 95 can be configured to slip into the drain 103a (shown in FIG. 3A) of the standpipe assembly 100.

FIG. 11A is a side view of bottom cover 140 from a filter element, and FIG. 11B is a bottom perspective view of the bottom cover 140, constructed and arranged in accordance with an implementation of the invention. Bottom cover 140 includes a seal 142 located on its bottom, the seal configured to engage a drain opening in a housing, such as at the base of standpipe assembly 100 as shown in FIG. 3A. When a filter element is installed on a standpipe assembly the seal 142 covers drain 103a at the base of the standpipe assembly 100. The drain 103a allows for unfiltered fuel in the filter housing to flow back to the fuel tank when the filter element is removed. However, this drain 103a is preferably closed, or substantially closed, when the filter element is installed so as to prevent fuel from draining out of the housing and back into the reservoir. The seal 142 engages the drain, thereby limiting fuel from flowing through the drain 103a when the element is installed in a housing, but opening the drain when the element is removed.

Additional configurations for filter elements are shown in FIGS. 12 to 19. FIG. 12 shows a full perspective view of a filter element 210 constructed and arranged in accordance with an implementation of the invention. FIG. 13 is a partial perspective view of the filter element 210 of FIG. 12, showing an enlarged view of the bottom of the filter element 210. Referring specifically to FIG. 13, the filter element 210 includes a central opening 220, plus a seal 242, a circumferential ridge 250, and a stop member 260. The central opening is configured to fit over a standpipe of filter housing, while the seal 242 is configured to engage a drain in the standpipe assembly. The circumferential ridge 250 extends around at least a portion of the bottom of the filter element 210. The circumferential ridge 250 shown in FIG. 12 and FIG. 13 engages the top lip 105 of the drain 103a of the standpipe assembly 100 shown in FIG. 3A. Typically the circumferential ridge 250 will have a diameter slightly larger or slightly smaller than the ridge 107 (see FIG. 3A) of the standpipe assembly 100. However, the circumferential ridge 250 is typically sized so as to come in contact with the top lip 105 of the drain 103a.

During installation of a filter element within a housing, the element is placed over the standpipe assembly 100 (See FIG. 3A). The circumferential ridge 250 on the bottom of the filter element 210 makes contact with the top lip 105 of the drain 103a. The filter element 210 can then be rotated until the seal 242 is positioned above the drain 103a, at which point the circumferential ridge 250 is no longer making contact with the top lip 105 of drain 103a, allowing the seal 242 to drop into place on the top lip 105 of the drain 103a. The rotation of the element is stopped by stop member 260, which engages the side of the drain 103a, thereby stopping rotation with the seal 242 engaging the drain 103a. When removing the filter element from the housing, the filter element is rotated in the opposite direction to the installation direction, while being pulled out of the housing, causing the seal 242 to disengage from the drain 103a of the standpipe assembly 100, and permitting unfiltered fuel retained within the housing to flow through the drain 103a and back to the fuel tank.

FIG. 14 is a bottom view of the filter element of FIG. 12. The central opening 220 is shown, along with the seal 242, circumferential ridge 250, and stop member 260. FIG. 15 is a side cross sectional view of the filter element of FIG. 12, and also shows the central opening 220 of the filter element, along with a spherical seal 242, a circumferential ridge 250, and a cross section of a portion of the stop member 260.

FIG. 16 is a partial perspective view of the filter element of FIG. 12, showing the bottom of a filter element mounted the base of a standpipe assembly 100. The filter element includes a circumferential ridge 250, along with a stop member 260. The stop member 260 is shown at rest in front of the drain 103b in the standpipe, of which the top lip 105 is also shown. The standpipe assembly includes a ridge 107, which is partially covered by the circumferential ridge 250 on the filter element (in this embodiment the circumferential ridge 250 is shown with a greater diameter than the ridge 107 in the standpipe). The circumferential ridge 250 is shown in a lowered position in which the seal (not shown) has descended onto the top lip 105 of the drain (not shown). This configuration is the installed configuration of the filter element 210 whereby the seal 242 (see FIGS. 13 to 15) has descended onto the drain 103a of the standpipe assembly of the filter housing (see FIG. 3A).

FIG. 17 is a partial side cross sectional view of the filter element of FIG. 15, showing the bottom of the filter element 210 mounted on a standpipe assembly. The filter element includes a circumferential ridge 250, along with a stop member 260. The stop member 260 is shown at rest in front of the drain 103a in the standpipe, of which the top lip 105 is present. The standpipe assembly includes a ridge 107, which is partially covered by the circumferential ridge 250 on the filter element. The circumferential ridge 250 is shown in a lowered position in which the seal 242 has descended onto the top lip 105 of the drain 103a. This configuration is the installed configuration of the filter element whereby the seal 242 has descended onto the drain 103a of the standpipe assembly of the filter housing.

FIG. 18 is a side cross sectional view a filter element with a seal 252 that is substantially hemi spherically shaped, having a flat bottom or umbrella shape. The filter element includes a circumferential ridge 250, along with a stop member 260.

FIG. 19 is a partial side cross sectional view of the filter element of FIG. 18, showing the bottom of the filter element mounted on a standpipe assembly. The filter element includes a circumferential ridge 250, along with a stop member 260. The stop member 260 is shown at rest in front of the drain in the standpipe, of which the top lip 105 is present. The standpipe assembly includes a ridge 107, which is partially covered by the circumferential ridge 250 on the filter element. The circumferential ridge 250 is shown in a lowered position in which the seal 252 has descended onto the top lip 105 of the drain 103a. This configuration is the installed configuration of the filter element whereby the seal 252 has descended onto the drain 103a of the standpipe assembly of the filter housing. FIG. 20A is a side view of bottom cover 240 from a filter element, and FIG. 20B is a bottom perspective view of the bottom cover 240, constructed and arranged in accordance with an implementation of the invention. Bottom cover 240 includes a seal 242 located on its bottom, the seal configured to engage a drain opening in a housing, such as at the base of standpipe assembly 100 as shown in FIG. 3A. Seal 242 does not contain a circumferential ridge, but stop member 260 includes a stop extension 260a extending around a portion of seal 242. During installation of a filter element within a housing, the element is placed over the standpipe assembly 100 (See FIG. 3A). The stop extension 260a on the bottom of the filter element 210 makes contact with the top lip 105 of the drain 103a. The filter element 210 can then be rotated until the seal 242 is positioned above the drain 103a, at which point the stop extension 260a is no longer making contact with the top lip 105 of drain 103a, allowing the seal 242 to drop into place on the top lip 105 of the drain 103a. The rotation of the element is stopped by stop member 260, which engages the side of the drain 103a, thereby stopping rotation with the seal 242 engaging the drain 103a. When removing the filter element from the housing, the filter element is rotated in the opposite direction to the installation direction, while being pulled out of the housing, causing the seal 242 to disengage from the drain 103a of the standpipe assembly 100, and permitting unfiltered fuel retained within the housing to flow through the drain 103a and back to the fuel tank.

FIG. 21 is a side cross sectional view of a filter element constructed in accordance with an implementation of the invention and positioned within a housing, showing fluid flows through the filter element.

FIG. 22A is a side cross sectional view of a filter element 10 constructed in accordance with an implementation of the invention, showing fluid flows through the filter element. FIG. 22B is a side cross sectional view of a filter element constructed in accordance with an implementation of the invention, showing fluid flows through the filter element.

FIG. 23 is a partial side view of portions of a sealing filter and stand pipe constructed and arranged in accordance with an example implementation. In particular, the figure shows a bottom plate 340 secured to a standpipe 400, the standpipe 400 having a drain with a top lip 405. A drain seal 442 seals the top lip 405 of the standpipe drain. In the configuration shown, the seal 442 is retained on the bottom plate 340 within a slot 350 on the bottom plate 340. This slot 350 is shown in further detail in FIG. 24, which is a bottom perspective view of the bottom plate 340 of FIG. 23 with the seal and standpipe removed. FIG. 23 shows the bottom plate 340 with the seal 442 within the slot 350, while FIG. 23 shows the bottom plate 340 without a seal within the slot 350. During production of the filter element the seal 442 is slid into slot 350 of the bottom plate 340 and retained in place. The seal 442 is typically also part of a larger seal construction, shown in FIGS. 26 to 29 below.

The bottom plate can include additional elements, such as further elements that assist in rotation or prevention of rotation of the filter element as it is placed on, or removed from the standpipe. For example, FIG. 25A shows a partial side view of an alternative filter. The construction of FIG. 25A shows a bottom plate 440 secured to a standpipe 500.

A drain grommet or seal 542 seals the top lip 505 of the standpipe drain 500. In the configuration shown, the seal 542 is retained on the bottom plate 440 by being retained on its top edge within a slot 450 on the bottom plate 440. This construction further shows a rib 460 projecting from the bottom of the bottom plate 440, the rib serving to engage the standpipe, to limit rotation (especially counterclockwise rotation) of the filter element once it is installed on a standpipe. FIG. 25B is a bottom perspective view of the bottom plate 340 of FIG. 25A, showing the slot 450 without a seal present. In addition, the anti-oration rib 460 is shown.

FIG. 26 is an example seal assembly 600 constructed and arranged in accordance with an implementation of the invention, showing a first sealing portion 610 and a second sealing portion 620. This construction can be used, for example, with the base plate 340 shown in FIGS. 23 and 24 or base plate 440 shown in FIGS. 25A and 25B. The first sealing portion 610 engages around a central portion of the standpipe, while the second sealing portion 620 engages the top of the drain seal. In the construction shown the first and second sealing portions 610 and 620 are shown integrally formed, but it will be understood that in some implementations the two portions can be separately formed and installed separately. The integral formation of the first and second sealing portions reduces the number of parts used, aids in installation, and keeps the second seal retained within the slot (such as slot 350) into which it is inserted.

FIG. 27 is an example seal assembly 700 constructed and arranged in accordance with an implementation of the invention, showing a first sealing portion 710 and a second sealing portion 720. This construction can be used, for example, with the base plate 340 shown in FIGS. 23 and 24 or base plate 440 shown in FIGS. 25A and 25B. The first sealing portion 710 engages around a central portion of the standpipe, while the second sealing portion 720 engages the top of the drain seal. In the construction shown the first and second sealing portions 710 and 720 are shown integrally formed, but it will be understood that in some implementations the two portions can be separately formed and installed separately. The integral formation of the first and second sealing portions reduces the number of parts used, aids in installation, and keeps the second seal from accidentally releasing from the slot (such as slot 350) into which it is inserted.

FIG. 28 is an example seal assembly 800 constructed and arranged in accordance with an implementation of the invention, showing a first sealing portion 810 and a second sealing portion 820. This construction can be used, for example, with the base plate 340 shown in FIGS. 23 and 24 or base plate 440 shown in FIGS. 25A and 25B. The first sealing portion 810 engages around a central portion of the standpipe, while the second sealing portion 820 engages the top of the drain seal. In the construction shown the first and second sealing portions 810 and 820 are shown integrally formed, but it will be understood that in some implementations the two portions can be separately formed and installed separately. The integral formation of the first and second sealing portions reduces the number of parts used, aids in installation, and keeps the second seal retained within the slot (such as slot 350) into which it is inserted.

FIG. 29 is an example seal assembly 900 constructed and arranged in accordance with an implementation of the invention, showing a first sealing portion 910 and a second sealing portion 920. This construction can be used, for example, with the base plate 340 shown in FIGS. 23 and 24 or base plate 440 shown in FIGS. 25A and 25B. The first sealing portion 910 engages around a central portion of the standpipe, while the second sealing portion 920 engages the top of the drain seal. In the construction shown the first and second sealing portions 910 and 920 are shown integrally formed, but it will be understood that in some implementations the two portions can be separately formed and installed separately. The integral formation of the first and second sealing portions reduces the number of parts used, aids in installation, and keeps the second seal retained within the slot (such as slot 350) into which it is inserted.

FIG. 30 is a bottom view of a base plate 1040, showing a seal with a double seal arrangement containing outer seal 1000 and inner seal 1010. In use the inner and outer seals 1000 and 1010 engage surfaces on the standpipe, as shown in FIG. 31, which is a partial sectional view of a filter element and standpipe 1100, showing a double seal in cross section. An alternative construction is shown in FIG. 32, which is a partial sectional view of a filter base plate 1140 and standpipe 1200, showing a single seal 1110 in cross section.

It will be understood that the filter element and components can be joined in various manners, such as mechanically using threads or clips. In some constructions a ratchet mechanism is used to retain components together. FIG. 33 is a partial view of an end cap 1160, which can be joined to bottom plate 1140 (shown in FIG. 34), and then locked in place to prevent rotation by means of interlocking teeth 1162 and 1142, respectively. The interlocking teeth 1162 and 1142 allow for the end cap 1160 and bottom plate 1140 to rotate together while the two pieces are being screwed together, but the interlocking teeth 1162 and 1142 prevent them from reversing and coming apart once engaged. This produces a strong lock between the end cap 1160 and bottom plate. 1140.

Applicants hereby incorporate by reference the following patent applications: WO2010020489, WO2010020514, WO2011113723, WO2012059389, WO2012076692, WO2013000807, and WO2011052818.

While the present invention has been described with reference to several particular implementations, those skilled in the art will recognize that many changes may be made hereto without departing from the spirit and scope of the present invention.

I claim:

1. A filter element for filtration of fuel, the filter element comprising,
    a first filter stage comprising filter media having pleats, wherein the pleats surround less than all of an open central volume; and
    a hydrophilic filter stage disposed downstream of the first stage;
    a flow director core positioned downstream of the hydrophilic filter stage, the flow director core substantially surrounding the open central volume and configured to primarily direct fluid tangentially around the core; and
    a fluid separator extending from the core, the fluid separator comprising a hydrophobic media.

2. The filter element for filtration of fuel of claim 1, wherein the hydrophilic filter stage comprises a coalescing filter media configured to coalesce water from a fuel stream passing through the media.

3. The filter element for filtration of fuel of claim 1, wherein the flow director is positioned substantially outside a radius formed by the hydrophilic filter stage.

4. The filter element for filtration of fuel of claim 1, wherein the flow director is positioned within the first filter stage.

5. The filter element for filtration of fuel of claim 1, wherein the flow director is configured to direct fluid from the hydrophilic filter stage to the hydrophobic filter stage.

6. The filter element for filtration of fuel of claim 1, wherein the hydrophobic media comprises a hydrophobic mesh material and is constructed and arranged such that mixed upstream fluid flow at the hydrophobic mesh is substantially tangential to the mesh.

7. The filter element for filtration of fuel of claim 1, wherein the hydrophobic filter stage comprises hydrophobic media oriented substantially along a plane parallel to the central axis of the filter element.

8. The filter element for filtration of fuel of claim 1, further comprising a hydrophobic stage, wherein the hydrophobic filter stage extends over a range of 5 to no more than 180 degrees of total arc around a central volume.

9. The filter element for filtration of fuel of claim 1, wherein the hydrophobic filter media extends in at least two arcs around the open central volume.

10. The filter element for filtration of fuel of claim 1, wherein the hydrophobic media extends in an axial direction along the filter element.

11. The filter element for filtration of claim 1, wherein the hydrophobic media extends less than and within the full axial length of the filter media.

12. The filter element for filtration of fuel of claim 1, wherein the hydrophobic filter media includes a fluid flow surface that extends in a radial direction.

13. The filter element for filtration of fuel of claim 1, wherein at least a portion of the hydrophobic media is disposed between an outer diameter and an inner diameter of the first stage.

14. The filter element of claim 1, further comprising a rotational alignment projection extending from a baseplate.

15. The filter element for filtration of fuel of claim 14, wherein the rotational alignment projection includes a seal member.

16. The filter element for filtration of fuel of claim 1 further comprising a baseplate with a seal member.

17. The filter element for filtration of fuel of claim 16, further comprising a circumferential ridge in the bottom of the baseplate, the circumferential ridge intersecting the seal member.

18. The filter element for filtration of fuel of claim 16, further comprising a stop member configured to engage a filter housing and stop rotation of the filter element upon engagement of the seal member with a drain opening on the housing.

19. A filter element for filtration of fuel, the filter element comprising,
a first filter stage comprising filter media having pleats, wherein the pleats surround less than all of an open central volume and a central axis; and
a hydrophilic filter stage disposed downstream of the first stage;
a fluid separator comprising a hydrophobic material having a separation surface, the separation surface aligned substantially radially to the central axis of the filter element
a flow director core positioned downstream of the hydrophilic filter stage, the flow director core substantially surrounding an open central volume and configured to primarily direct fluid tangentially around the core; and
a fluid separator extending from the core, the fluid separator comprising a hydrophobic media.

20. The filter element for filtration of fuel of claim 19, wherein the hydrophilic filter stage comprises a coalescing filter media configured to coalesce water from a fuel stream passing through the media.

* * * * *